United States Patent
Huang et al.

(10) Patent No.: US 12,003,855 B2
(45) Date of Patent: Jun. 4, 2024

(54) OPTICAL IMAGE STABILIZATION DRIVER DEVICE FOR STABLE MOVEMENT OF IMAGE SENSOR, CAMERA MODULE AND ELECTRONIC DEVICE

(71) Applicant: LARGAN PRECISION CO., LTD., Taichung (TW)

(72) Inventors: Chen-Yi Huang, Taichung (TW); Lin An Chang, Taichung (TW); Ming-Ta Chou, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 0 days.

(21) Appl. No.: 17/880,043

(22) Filed: Aug. 3, 2022

(65) Prior Publication Data

US 2023/0283899 A1    Sep. 7, 2023

Related U.S. Application Data

(60) Provisional application No. 63/316,849, filed on Mar. 4, 2022.

(51) Int. Cl.
*H04N 23/68* (2023.01)
*H04N 23/54* (2023.01)

(52) U.S. Cl.
CPC .......... *H04N 23/687* (2023.01); *H04N 23/54* (2023.01)

(58) Field of Classification Search
CPC ...... H04N 23/687; H04N 23/54; H04N 23/55; H04N 23/57
See application file for complete search history.

(56) References Cited

U.S. PATENT DOCUMENTS

| | | |
|---|---|---|
| 10,071,903 B2 | 9/2018 | Liu |
| 10,924,675 B2 | 2/2021 | Hubert |
| 2019/0020822 A1 | 1/2019 | Sharma et al. |
| 2019/0141248 A1 | 5/2019 | Hubert et al. |
| 2020/0036898 A1 | 1/2020 | Kuo |
| 2020/0099317 A1 | 3/2020 | Wang |

(Continued)

FOREIGN PATENT DOCUMENTS

| | | |
|---|---|---|
| CN | 207571371 A | 7/2018 |
| CN | 108600608 B | 9/2018 |

OTHER PUBLICATIONS

European Search Report dated Jan. 5, 2023 as received in application No. 22188844.9.

*Primary Examiner* — Padma Haliyur
(74) *Attorney, Agent, or Firm* — Maschoff Brennan

(57) ABSTRACT

An optical image stabilization driver device includes an image sensor, a fixed carrier, a circuit element, an elastic element and a driving element. The circuit element includes a fixed part disposed on the fixed carrier, a movable part and an electrical transmission part. The image sensor is disposed on the movable part. The electrical transmission part has conductive routes electrically connected to the movable part and the fixed part. The elastic element includes a first frame part corresponding to the fixed part, a second frame part corresponding to the movable part and an elastic connection part connected to the first frame part and the second frame part and providing the image sensor with a freedom of movement in a plane. The driving element is configured to drive the image sensor to move relative the fixed carrier in the plane.

21 Claims, 23 Drawing Sheets

(56) References Cited

U.S. PATENT DOCUMENTS

| | | | |
|---|---|---|---|
| 2021/0239933 A1* | 8/2021 | Tseng | H04N 23/54 |
| 2021/0337121 A1 | 10/2021 | Johnson et al. | |
| 2021/0409604 A1* | 12/2021 | Sharma | G03B 30/00 |
| 2022/0011537 A1 | 1/2022 | Chang | |
| 2022/0014677 A1 | 1/2022 | Smyth | |
| 2023/0128842 A1* | 4/2023 | Lee | H04N 23/55 |
| | | | 348/208.11 |
| 2023/0156310 A1* | 5/2023 | Jang | H02K 41/0354 |
| | | | 348/208.2 |

* cited by examiner

OPTICAL IMAGE STABILIZATION DRIVER DEVICE FOR STABLE MOVEMENT OF IMAGE SENSOR, CAMERA MODULE AND ELECTRONIC DEVICE

RELATED APPLICATIONS

This application claims priority to U.S. Provisional Application 63/316,849, filed on Mar. 4, 2022, which is incorporated by reference herein in its entirety.

BACKGROUND

Technical Field

The present disclosure relates to an optical image stabilization driver device, a camera module and an electronic device, more particularly to an optical image stabilization driver device and a camera module applicable to an electronic device.

Description of Related Art

With the development of semiconductor manufacturing technology, the performance of image sensors has been improved, and the pixel size thereof has been scaled down. Therefore, featuring high image quality becomes one of the indispensable features of an optical system nowadays. Furthermore, due to the rapid changes in technology, mobile phones equipped with optical systems are trending towards multi-functionality for various applications, and therefore the functionality requirements for the optical systems have been increasing.

Since mobile phones equipped with optical lens systems are getting thinner and lighter and consumers are used to operate the mobile phones one-handed, the image quality can be easily degraded due to camera shake. In addition, since users always take photos using mobile phones indoors and the background brightness is usually insufficient, it can easily result in camera shake, too. Therefore, in developing the mobile phones equipped with optical lens systems, besides increasing pixels of image sensors and additionally providing autofocus and zoom functionalities, an optical image stabilization function is also essential. However, in order to realize the above functions, the structure of mobile phones becomes complexer and the size of the mobile phones increases, and therefore, the size of the electronic device also increases. Therefore, providing an image stabilization driving device satisfying the requirements of high image quality, compact size, simple structure and easy manufacturing and assembling is a hot topic in this field.

SUMMARY

According to one aspect of the present disclosure, an optical image stabilization driver device includes an image sensor, at least one fixed carrier, a circuit element, an elastic element and a driving element. The circuit element includes a fixed part, a movable part and an electrical transmission part. The fixed part is disposed on the fixed carrier, and the image sensor is disposed on the movable part and electrically connected to the movable part. The electrical transmission part has a plurality of conductive routes electrically connected to the movable part and the fixed part, and the conductive routes are configured to transmit an electrical signal of the image sensor from the movable part to the fixed part. The elastic element includes a first frame part, a second frame part and an elastic connection part. The first frame part corresponds to the fixed part of the circuit element, and the second frame part corresponds to the movable part of the circuit element. The elastic connection part is connected to the first frame part and the second frame part, and the elastic connection part provides the image sensor with a freedom of movement in a plane. The driving element is configured to drive the image sensor to move relative to the fixed carrier in the plane. In addition, the optical image stabilization driver device further includes an insulation element, and at least a part of the insulation element is disposed corresponding to at least one of the electrical transmission part, the fixed part and the movable part of the circuit element.

According to another aspect of the present disclosure, an optical image stabilization driver device includes an image sensor, at least one fixed carrier, a circuit element, an elastic element and a driving element. The circuit element includes a fixed part, a movable part and an electrical transmission part. The fixed part is disposed on the fixed carrier, and the image sensor is disposed on the movable part and electrically connected to the movable part. The electrical transmission part has a plurality of conductive routes electrically connected to the movable part and the fixed part, and the conductive routes are configured to transmit an electrical signal of the image sensor from the movable part to the fixed part. The elastic element includes a first frame part, a second frame part and an elastic connection part. The first frame part corresponds to the fixed part of the circuit element, and the second frame part corresponds to the movable part of the circuit element. The elastic connection part is connected to the first frame part and the second frame part, and the elastic connection part provides the image sensor with a freedom of movement in a plane. The driving element is configured to drive the image sensor to move relative to the fixed carrier in the plane. In addition, the elastic connection part has a plurality of elastic arms, two ends of each elastic arm are respectively connected to the first frame part and the second frame part, and the elastic arms are not in physical contact with the conductive routes.

According to another aspect of the present disclosure, a camera module includes an optical imaging device, an autofocus driving device and one of the aforementioned optical image stabilization driver devices. In addition, the autofocus driving device is configured to drive the optical imaging device to move along an optical axis of the optical imaging device, and the image sensor of the optical image stabilization driver device is disposed on an image surface of the optical imaging device.

According to another aspect of the present disclosure, an electronic device includes the aforementioned camera module.

BRIEF DESCRIPTION OF THE DRAWINGS

The disclosure can be better understood by reading the following detailed description of the embodiments, with reference made to the accompanying drawings as follows.

DETAILED DESCRIPTION

Figure 1:
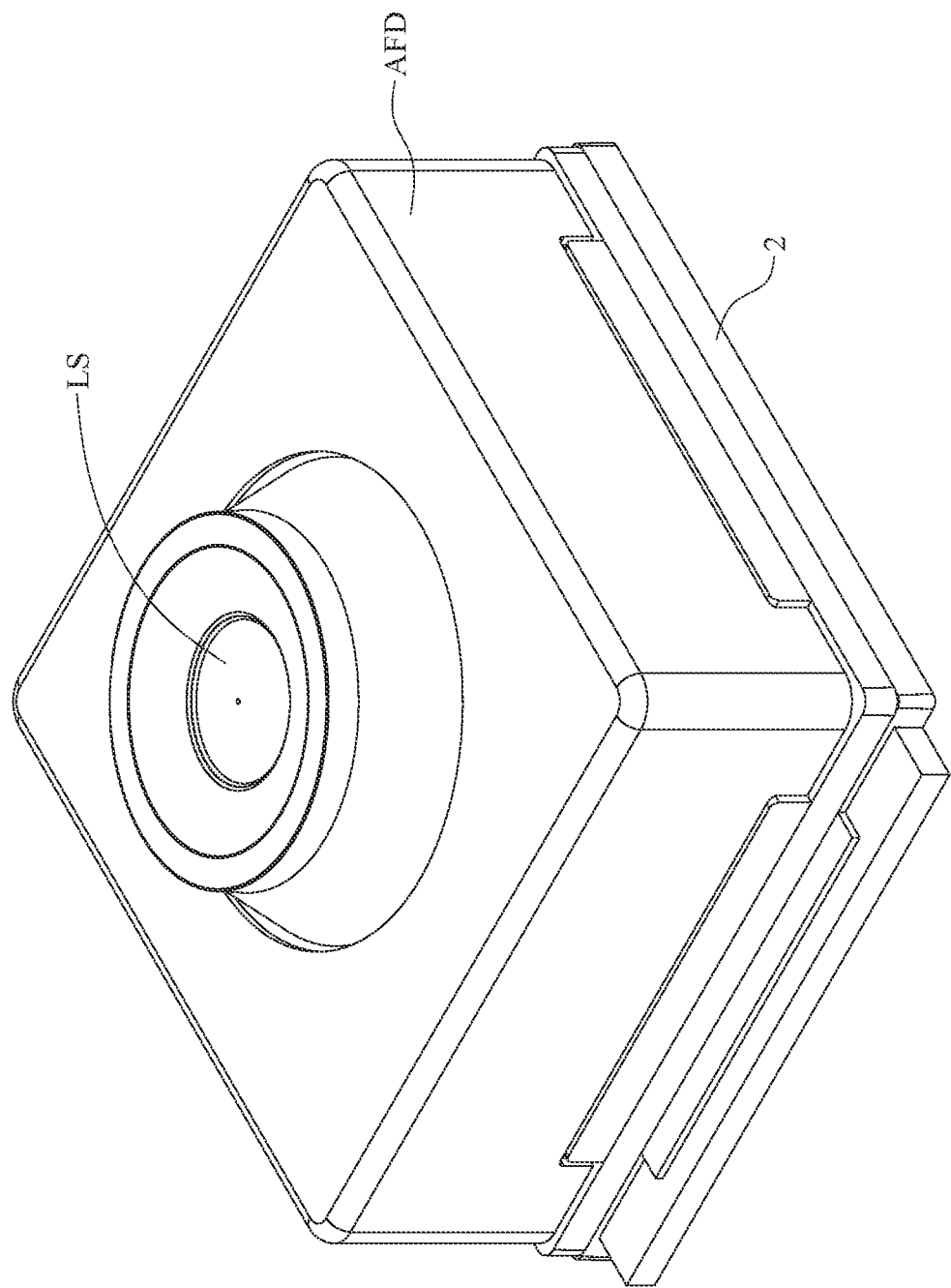
FIG. 1 is a perspective view of a camera module according to the 1st embodiment of the present disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

The present disclosure provides an optical image stabilization driver device. The optical image stabilization driver device includes an image sensor, at least one fixed carrier, a circuit element, an elastic element and a driving element.

The circuit element includes a fixed part, a movable part and an electrical transmission part. The fixed part is disposed on the fixed carrier, and the image sensor is disposed on the movable part and electrically connected to the movable part. The electrical transmission part has a plurality of conductive routes, and the conductive routes are electrically connected to the movable part and the fixed part and configured to transmit an electrical signal of the image sensor from the movable part to the fixed part. In addition, the conductive routes of the circuit element are, for example, electrically connected to the circuitry of the movable part and the circuitry of the fixed part.

The elastic element includes a first frame part, a second frame part and an elastic connection part. The first frame part corresponds to the fixed part of the circuit element, and the second frame part corresponds to the movable part of the circuit element. The elastic connection part is connected to the first frame part and the second frame part, and the elastic connection part provides the image sensor with a freedom of movement in a plane.

The driving element is configured to drive the image sensor to move relative to the fixed carrier in the plane. In addition, the image sensor together with the movable part of the circuit element and the second frame part of the elastic element is movable relative to the fixed carrier in a plane.

According to the present disclosure, by the arrangement of the circuit element and the elastic element as described above, the image sensor is provided with a freedom of movement, and an image signal can be transmitted during a driving process, such that the optical image stabilization function can be achieved. Furthermore, the circuit element and the elastic element are two individual components which are assembled to each other, such that the manufacturing process can be simplified, and the precision of the circuit element can be increased.

The optical image stabilization driver device can further include an insulation element, and at least a part of the insulation element is disposed corresponding to at least one of the electrical transmission part, the fixed part and the movable part of the circuit element. Therefore, it is favorable for preventing mechanical interferences between the circuit element and the elastic element, and reducing noises during signal transmissions. Moreover, at least a part of the insulation element can be disposed corresponding to at least a part of the electrical transmission part of the circuit element. Therefore, it is favorable for protecting the conductive routes so as to prevent short circuits. Moreover, the insulation element can be disposed between the circuit element and the elastic element so as to prevent mechanical interferences between the circuit element and the elastic element. Moreover, the insulation element can be, for example, an insulation glue, a plastic board, a circuit board, a flexible circuit board or a circuit substrate, but the present disclosure is not limited thereto. In one configuration, there can be no insulation element between the circuit element and the elastic element, but the circuit element and the elastic element are spaced apart from each other while maintaining transmission stability of the electrical signal.

The elastic connection part can have a plurality of elastic arms. Two ends of each of the elastic arms are respectively connected to the first frame part and the second frame part, and the elastic arms are not in physical contact with the conductive routes. Therefore, by misaligning the elastic arms and the conductive routes, signal transmission errors can be prevented, and the driving stability can be improved.

The optical image stabilization driver device can further include a movable carrier, and the movable carrier is disposed on the movable part of the circuit element and movable relative to the fixed carrier.

The circuit element can be a flat structure, and the elastic element can be a flat structure. When a thickness of the circuit element is Hc, and a thickness of the elastic element is He, the following conditions can be satisfied: 0.01 mm<Hc<0.85 mm; and 0.01 mm<He<0.85 mm. Therefore, the circuit element and the elastic element are disposed in a stacked manner, so that it facilitates the positioning and identification of components so as to simplify the assembly process. Please refer to FIG. 8, which shows a schematic view of Hc and He according to the 1st embodiment of the present disclosure.

When the thickness of the circuit element is Hc, and the thickness of the elastic element is He, the following condition can be satisfied: Hc<He. Therefore, through the design of microcircuits, the dimensions of the optical image stabilization driver device can be reduced.

Each of the elastic arms of the elastic connection part can include at least one curved part located between the two ends of each of the elastic arms (i.e., each elastic arm can include at least one curved part between two ends thereof, and the two ends are respective connected to the first frame part and the second frame part). Therefore, it is favorable for balancing the amount of movement in two dimensions and increasing the reliability of the elastic element.

When a height of each of the elastic arms is H, and a width of each of the elastic arms is W, the following condition can be satisfied: 0.2≤W/H≤1. Therefore, the elastic arms provide larger transverse deformable amount and maintain the axial support function. Please refer to FIG. 14, which shows a schematic view of W and H according to the 1st embodiment of the present disclosure.

The electrical transmission part may not provide physical support to other component, and the elastic connection part can provide the movable part with an axial support force and a translational restoring force. Therefore, it is favorable for the calculation of loop control so as to increase driving efficiency.

The driving element can include a coil and a magnet. The coil and the magnet are disposed corresponding to each other, and the coil and the magnet are configured to provide a driving force for optical image stabilization. Therefore, it is favorable for providing a driving force for driving the image sensor to move in the plane. Moreover, the coil together with the movable carrier can be disposed on the movable part. Moreover, the magnet together with an autofocus driving device can be disposed on the fixed carrier. Therefore, there is no relative motion between the magnet and the fixed carrier so as to provide a more stable magnetic field distribution. Moreover, the magnet can be disposed on the autofocus driving device and fixed to the fixed carrier by the autofocus driving device, but the present disclosure is not limited thereto. In other configurations, the magnet can be directly disposed on the fixed carrier.

The electrical transmission part can have at least one lateral conducting wire disposed on one lateral side of at least one of the conductive routes. Therefore, a more flexible cable arrangement design is favorable for disposing multiple conducting wires on the conductive routes. Moreover, the lateral conducting wire can be, for example, a copper wire.

A Young's modulus of the elastic element can be larger than a Young's modulus of the circuit element. Therefore, it is favorable for reducing the influence of the circuit element during the driving process, and the mechanical support function is only provided by the elastic element. Moreover, the elastic element has a larger Young's modulus, so that the elastic constant of the elastic connection part of the elastic element is larger than that of the electrical transmission part of the circuit element.

The circuit element can have a polyimide material. Therefore, it is favorable for providing the feasibility of mass production.

The optical image stabilization driver device can further include a damper disposed on at least a part of the electrical transmission part. Therefore, it is favorable for absorbing vibration generated during the driving process so as to prevent fracture of the conductive routes.

The present disclosure provides a camera module including an optical imaging device, an autofocus driving device and the aforementioned optical image stabilization driver device. Moreover, the autofocus driving device is configured to drive the optical imaging device to move along an optical axis of the optical imaging device, and the image sensor of the optical image stabilization driver device is disposed on an image surface of the optical imaging device. Moreover, the optical image stabilization driver device and the autofocus driving device can share the magnet.

The present disclosure provides an electronic device including the aforementioned camera module.

According to the present disclosure, the aforementioned features and conditions can be utilized in numerous combinations so as to achieve corresponding effects.

According to the above description of the present disclosure, the following specific embodiments are provided for further explanation.

1st Embodiment

Figure 2:
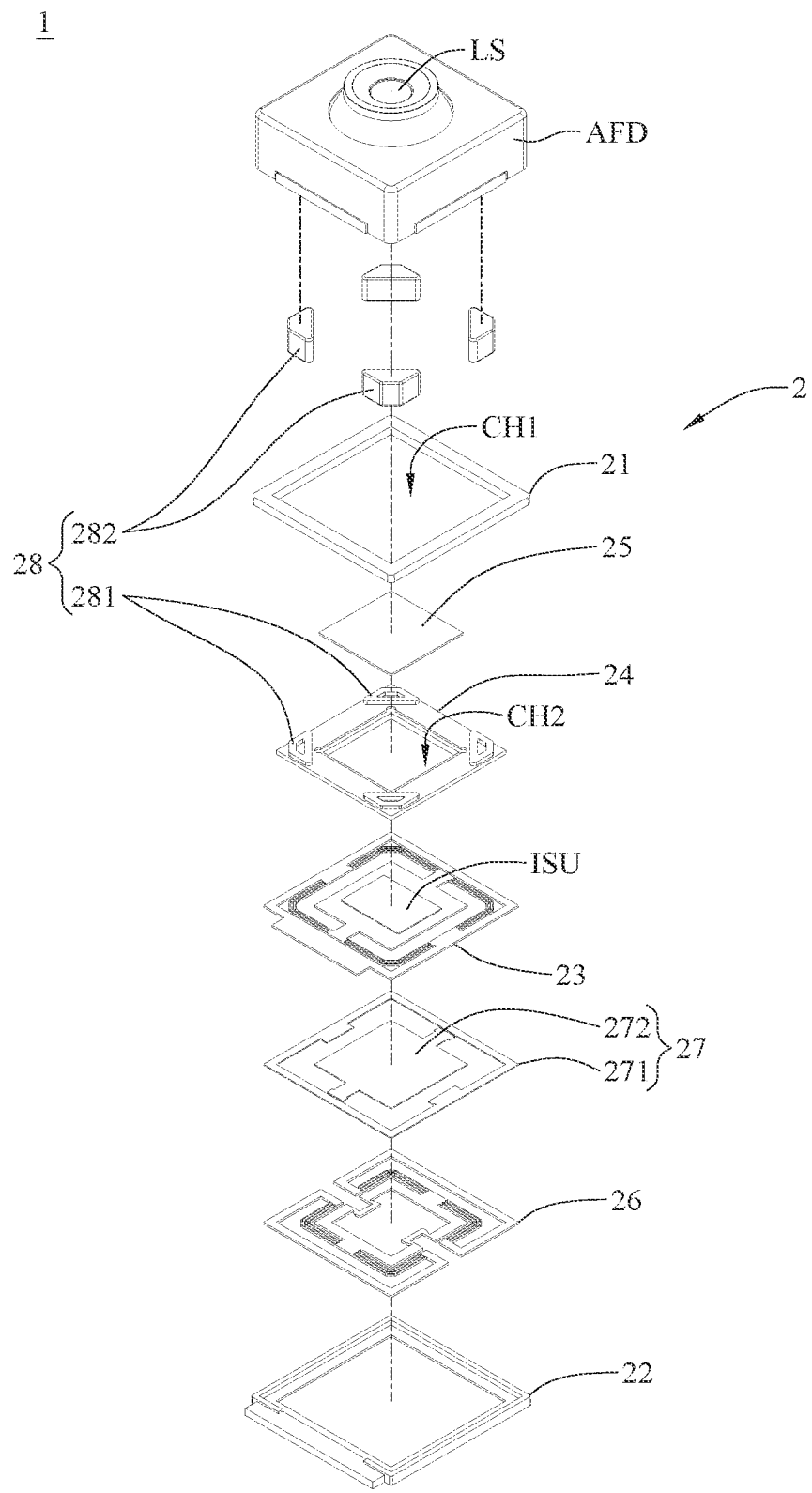
FIG. 2 is an exploded view of the camera module in FIG. 1.
Figure 3:
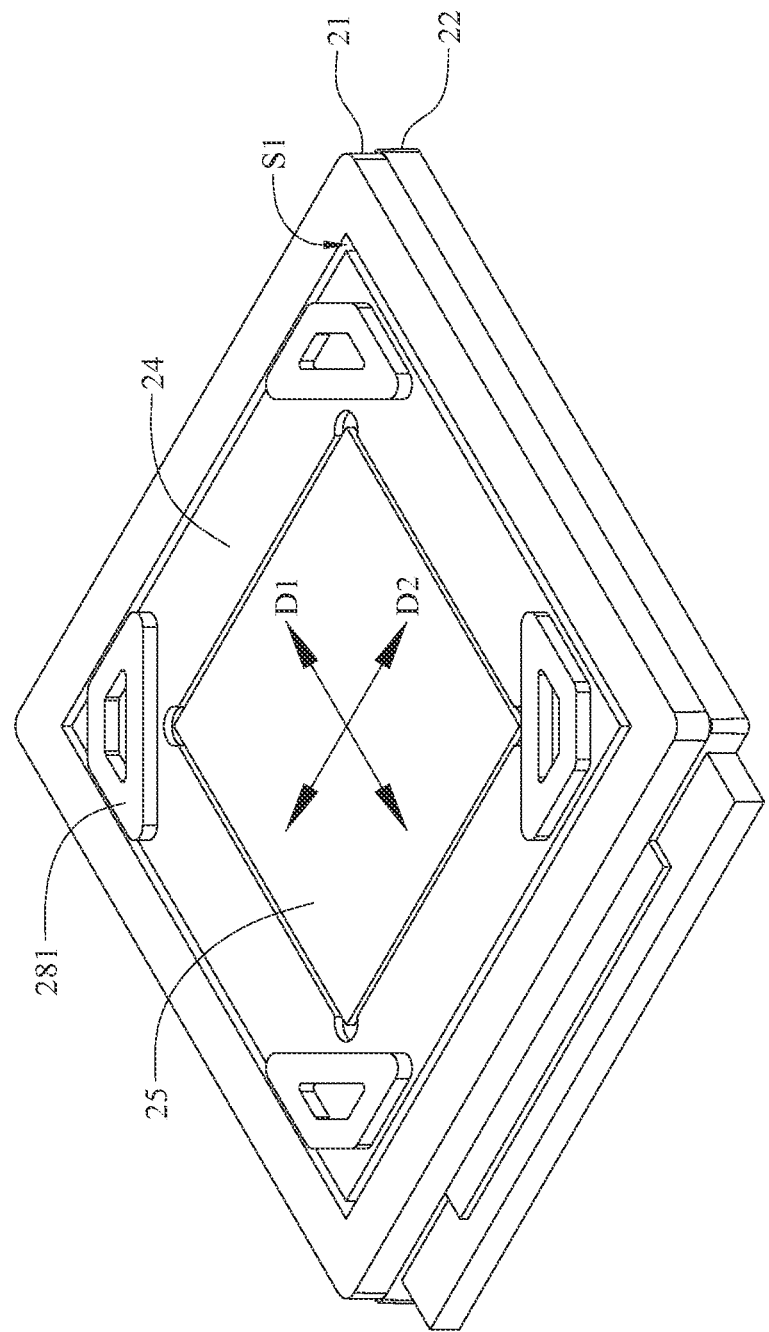
FIG. 3 is a perspective view of some components of an optical image stabilization driver device in FIG. 1.
Figure 4:
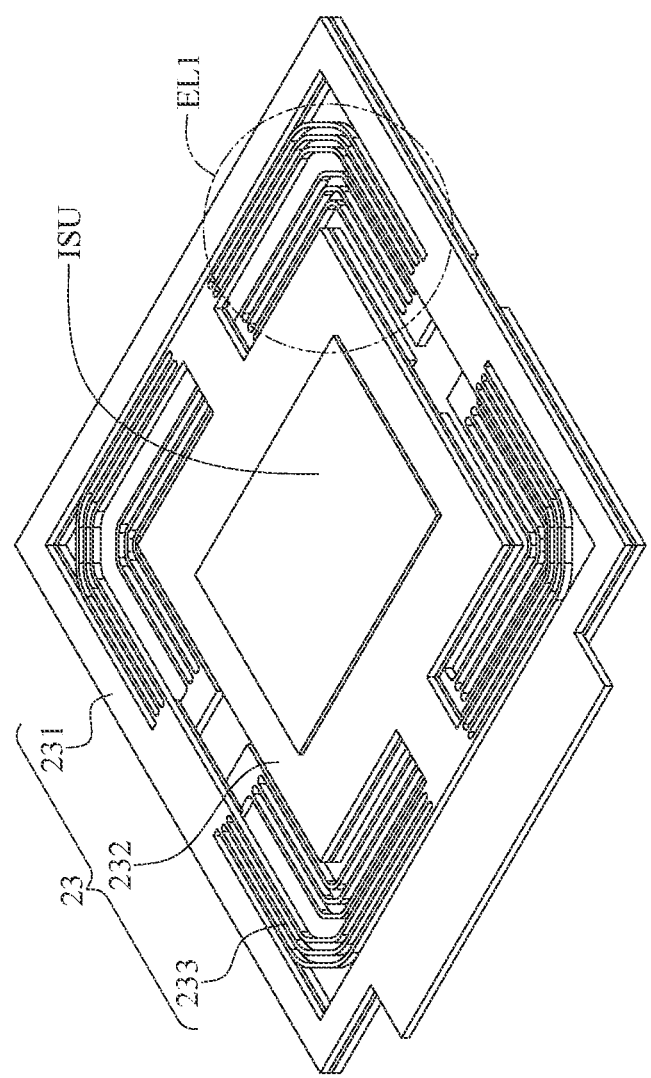
FIG. 4 is a perspective view of a circuit element, a driving element and an insulation element in FIG. 1.
Figure 5:
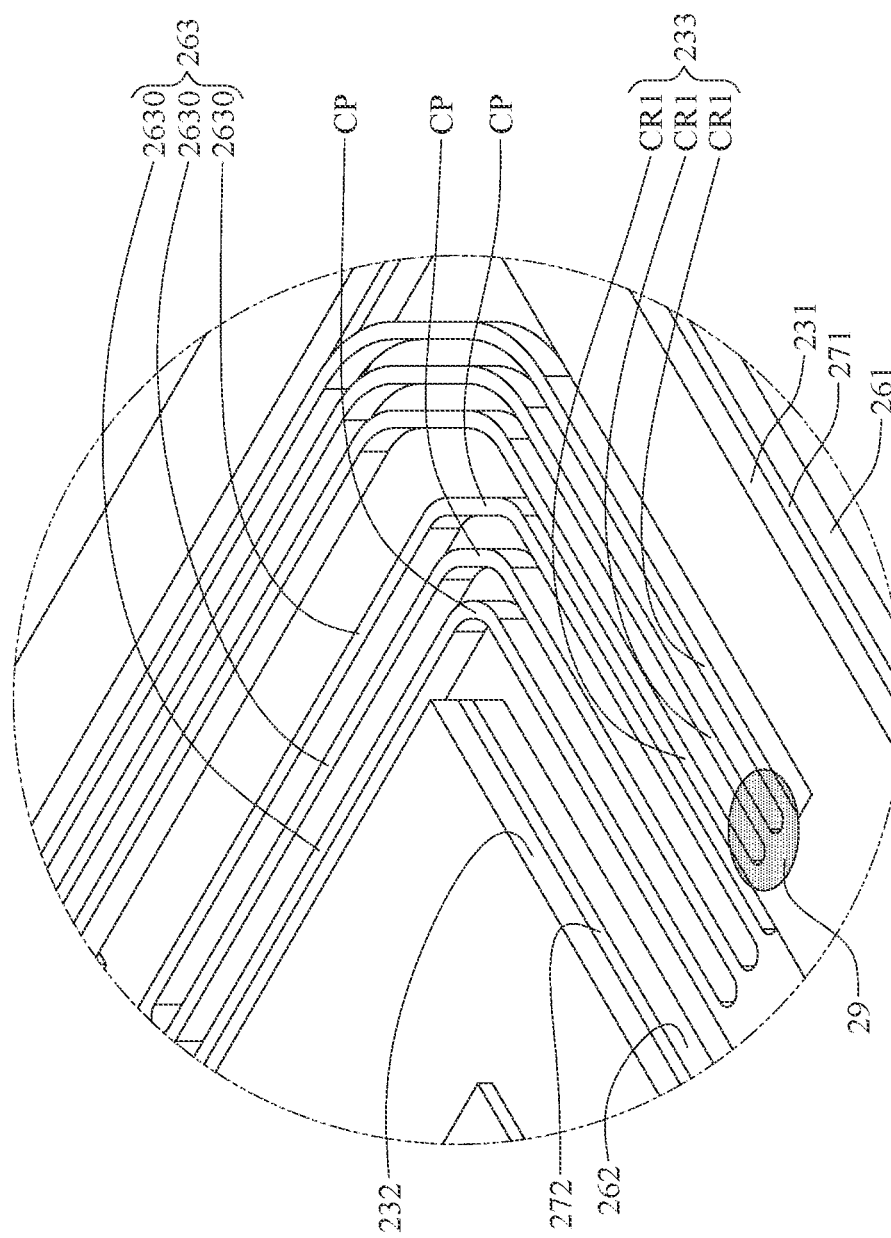
FIG. 5 is an enlarged view of region EL1 in FIG. 4.
Figure 6:
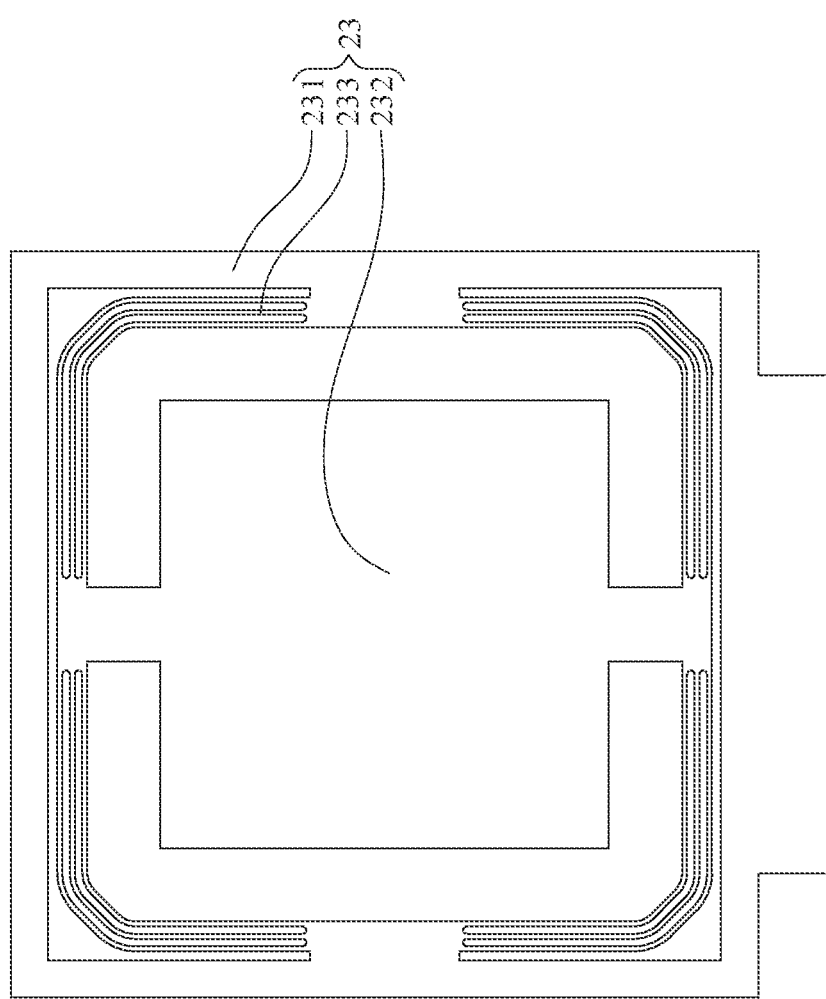
FIG. 6 is a top view of the circuit element in FIG. 4.
Figure 7:
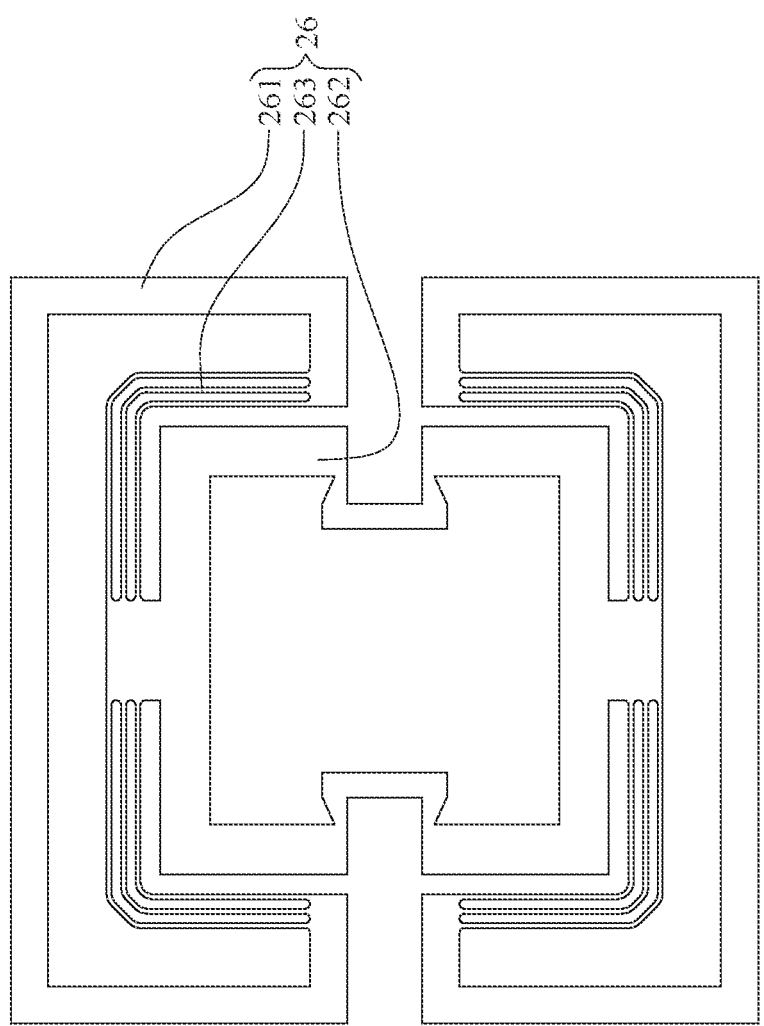
FIG. 7 is a top view of the driving element in FIG. 4.
Figure 8:
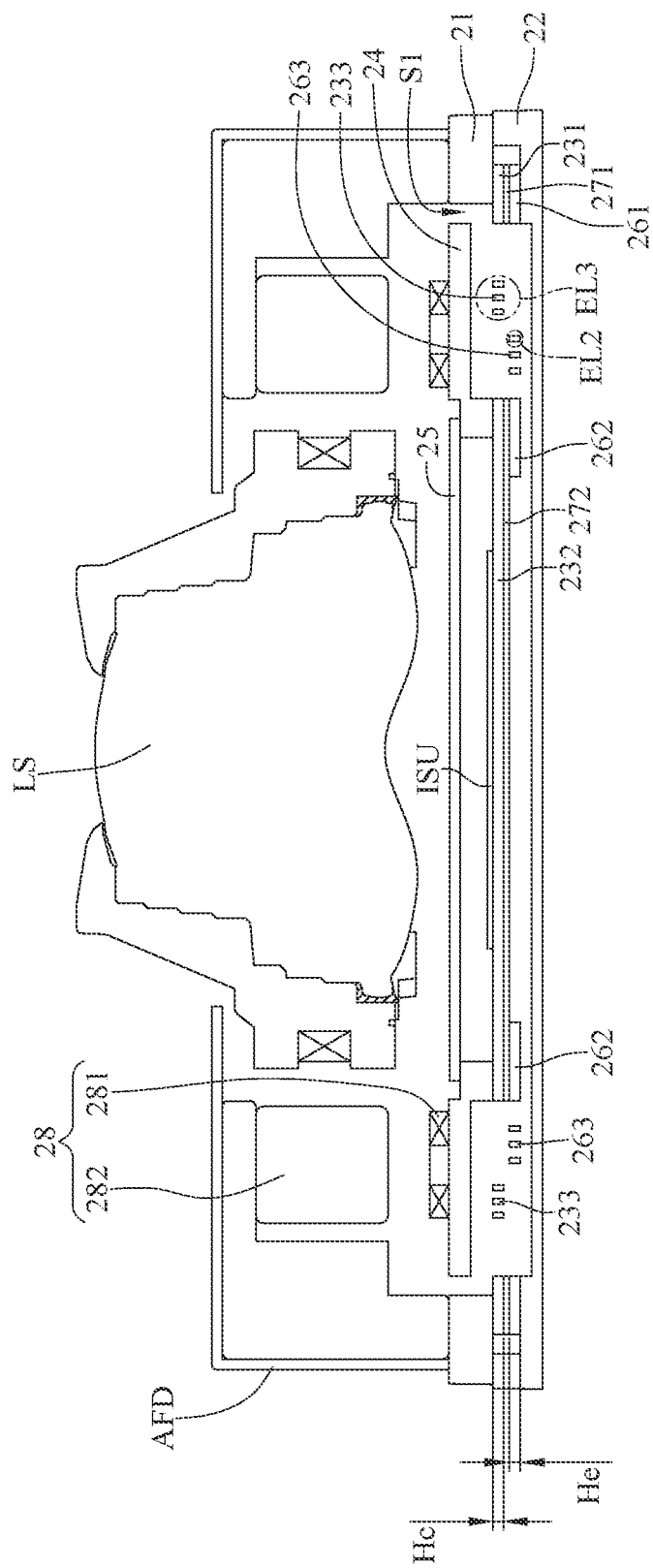
FIG. 8 is a cross-sectional view of the camera module in FIG. 1.
Figure 9:
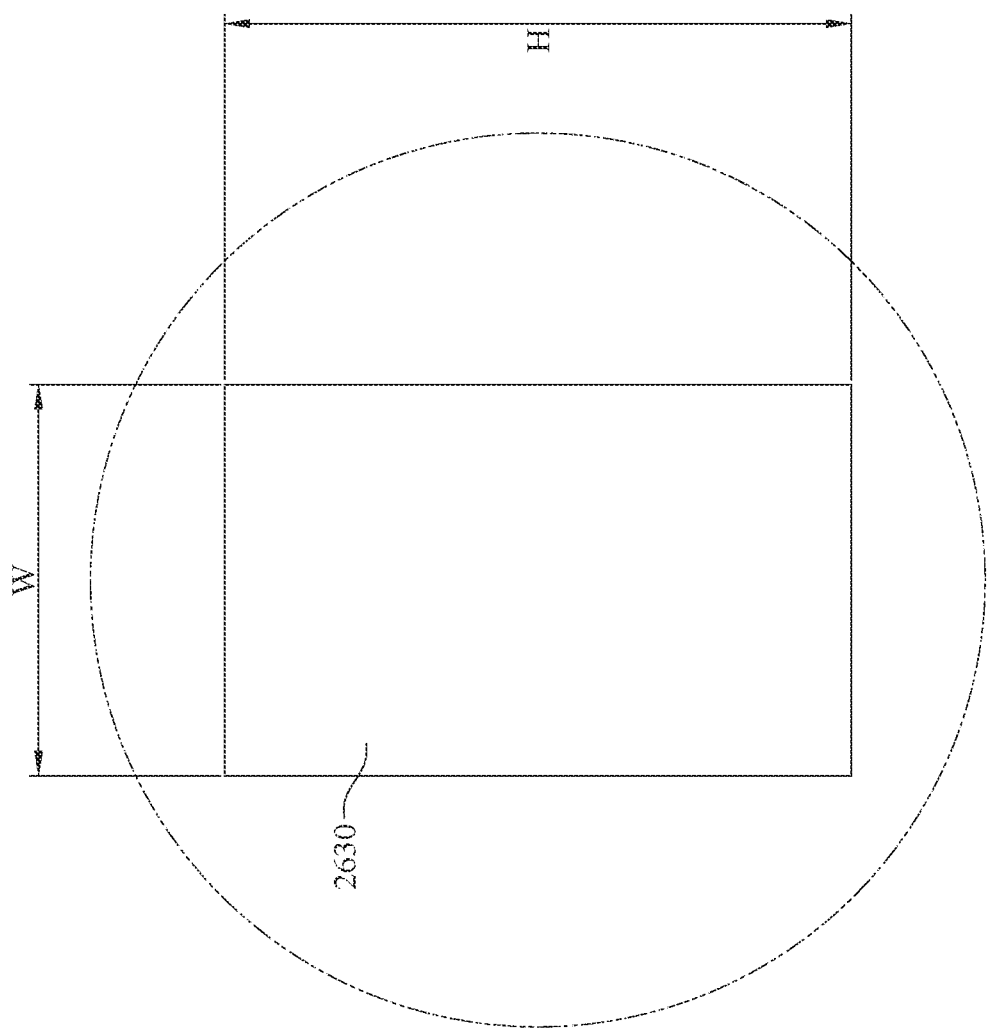
FIG. 9 is an enlarged view of one elastic arm of an elastic connection part of an elastic element in region EL2 in FIG. 8.

FIG. 1 is a perspective view of a camera module according to the 1st embodiment of the present disclosure, FIG. 2 is an exploded view of the camera module in FIG. 1, FIG. 3 is a perspective view of some components of an optical image stabilization driver device in FIG. 1, FIG. 4 is a perspective view of a circuit element, a driving element and an insulation element in FIG. 1, FIG. 5 is an enlarged view of region EU in FIG. 4, FIG. 6 is a top view of the circuit element in FIG. 4, FIG. 7 is a top view of the driving element in FIG. 4, FIG. 8 is a cross-sectional view of the camera module in FIG. 1, and FIG. 9 is an enlarged view of one elastic arm of an elastic connection part of an elastic element in region EL2 in FIG. 8.

In this embodiment, a camera module 1 is provided. The camera module 1 includes an optical imaging device LS, an autofocus driving device AFD and an optical image stabilization driver device 2. The autofocus driving device AFD is configured to drive the optical imaging device LS to move along an optical axis of the optical imaging device LS, the optical image stabilization driver device 2 is disposed on an image side of the optical imaging device LS, and an image sensor ISU of the optical image stabilization driver device 2 is disposed on an image surface of the optical imaging device LS.

The optical image stabilization driver device 2 includes the image sensor ISU, an upper fixed carrier 21, a lower fixed carrier 22, a circuit element 23, a movable carrier 24, a filter 25, an elastic element 26, an insulation element 27, a driving element 28 and a damper 29.

The upper fixed carrier 21 and the lower fixed carrier 22 are stacked on each other and together form an accommodation space S1. The upper fixed carrier 21 has an opening CH1 connected to the accommodation space S1, and the opening CH1 is configured for light rays from the optical imaging device LS to pass through into the accommodation space S1.

The circuit element 23 is a flat structure and disposed in the accommodation space S1, and the circuit element 23 includes a fixed part 231, a movable part 232 and an electrical transmission part 233. The fixed part 231 is fixed to the upper fixed carrier 21, and the fixed part 231 surrounds the movable part 232. The electrical transmission part 233 is located between the fixed part 231 and the movable part 232. The electrical transmission part 233 has a plurality of conductive routes CR1, and the conductive routes CR1 are connected to the movable part 232 and the fixed part 231. The conductive routes CR1 are electrically connected to the circuitry of the movable part 232 and the circuitry of the fixed part 231. In addition, the movable part 232 is movable relative to the fixed part 231.

The image sensor ISU is disposed on the movable part 232 and electrically connected to the movable part 232, and the conductive routes CR1 are configured to transmit electrical signals of the image sensor ISU from the movable part 232 to the fixed part 231.

The movable carrier 24 is fixed to the movable part 232, and the movable carrier 24 has a through hole CH2. The through hole CH2 of the movable carrier 24 exposes the image sensor ISU disposed on the movable part 232.

The filter 25 is disposed on the movable carrier 24 and covers the through hole CH2 of the movable carrier 24.

The elastic element 26 is a flat structure and disposed in the accommodation space S1, and the elastic element 26 is located on one side of the circuit element 23 located away from the optical imaging device LS. The elastic element 26 includes a first frame part 261, a second frame part 262 and an elastic connection part 263. The first frame part 261 is fixed to the lower fixed carrier 22, and the first frame part 261 corresponds to the fixed part 231 of the circuit element 23. The second frame part 262 corresponds to the movable part 232 of the circuit element 23, and the second frame part 262 is fixed to the movable part 232. The elastic connection part 263 is elastic and connected to the first frame part 261 and the second frame part 262, so that the second frame part 262 is movable relative to the first frame part 261, and the elastic connection part 263 provides the image sensor ISU disposed on the movable part 232 with a freedom of movement in a plane.

In this embodiment, the elastic connection part 263 has a plurality of elastic arms 2630, and two ends of each of the elastic arms 2630 are respectively connected to the first frame part 261 and the second frame part 262. The elastic arms 2630 are not in physical contact with the conductive routes CR1 of the electrical transmission part 233, and the elastic arms 2630 do not overlap with the conductive routes CR1 in a direction parallel to the optical axis. Furthermore, each elastic arm 2630 includes a curved part CP located between the two ends thereof.

In this embodiment, the electrical transmission part 233 of the circuit element 23 does not provide physical support to other component, and the elastic connection part 263 of the elastic element 26 provides the movable part 232 with an axial support force and a translational restoring force.

The insulation element 27 includes an outer insulation part 271 and an inner insulation part 272. The outer insulation part 271 and the fixed part 231 of the circuit element 23 are disposed corresponding to each other, and the outer insulation part 271 is located between the fixed part 231 of the circuit element 23 and the first frame part 261 of the elastic element 26. The inner insulation part 272 and the movable part 232 of the circuit element 23 are disposed corresponding to each other, and the inner insulation part 272 is located between the movable part 232 of the circuit element 23 and the second frame part 262 of the elastic element 26, such that the second frame part 262 is indirectly fixed to the movable part 232 via the inner insulation part 272. In this embodiment, a part of the insulation element 27 is disposed corresponding to the two ends of the electrical transmission part 233 connected to the movable part 232 and the fixed part 231.

The driving element 28 is configured to drive the image sensor ISU to move relative to the upper and lower fixed carriers 21 and 22 in the plane. In detail, the driving element 28 includes a plurality of coils 281 and a plurality of magnets 282 disposed corresponding to each other, and the coils 281 and the magnets 282 are configured to provide a driving force for optical image stabilization. Moreover, the coils 281 are disposed on the movable carrier 24, such that the coils 281 together with the movable carrier 24 are disposed on the movable part 232. The magnets 282 are disposed on the autofocus driving device AFD, and the magnets together with the autofocus driving device AFD are fixed to the upper fixed carrier 21. In this embodiment, the driving force generated by the coils 281 and the magnets 282 can drive the movable carrier 24 to move so as to drive the movable part 232 of the circuit element 23 together with the filter 25, the image sensor ISU and the second frame part 262 of the elastic element 26 to move relative to the upper and lower fixed carriers 21 and 22 in the plane along directions D1 and D2 (as shown in FIG. 3).

As shown in FIG. 5, the damper 29 is disposed on a part of the electrical transmission part 233 so as to absorb vibration generated during a driving process.

In this embodiment, a Young's modulus of the elastic element 26 is larger than a Young's modulus of the circuit element 23, and the circuit element 23 has a polyimide material.

When a thickness of the circuit element 23 is Hc, and a thickness of the elastic element 26 is He, the following conditions are satisfied: Hc=0.19 mm; He=0.32 mm; and Hc<He.

When a height of each of the elastic arms 2630 is H, and a width of each of the elastic arms 2630 is W, the following conditions are satisfied: W=0.05 mm; H=0.15 mm; and W/H=0.33.

Figure 10:
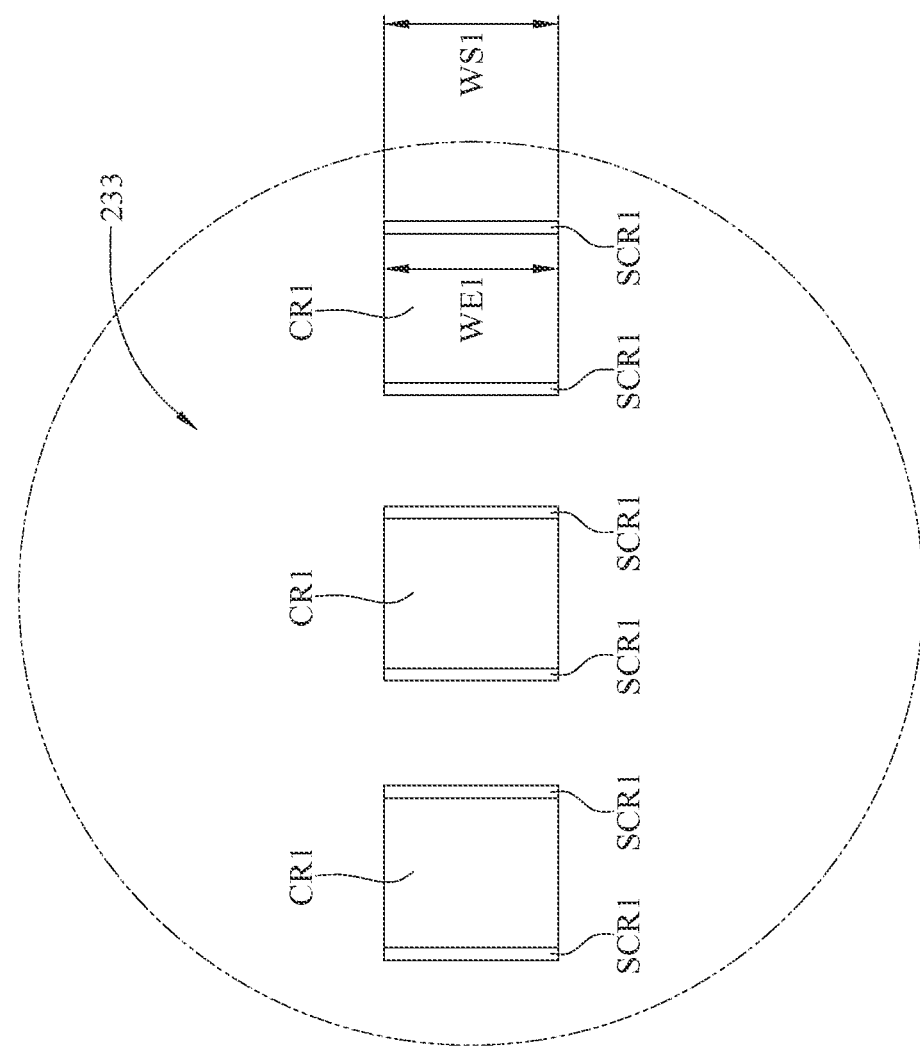
FIG. 10 is an enlarged view of conductive routes and lateral conducting wires of an electrical transmission part of the circuit element in region EL3 in FIG. 8 according to one example of the present disclosure.
Figure 11:
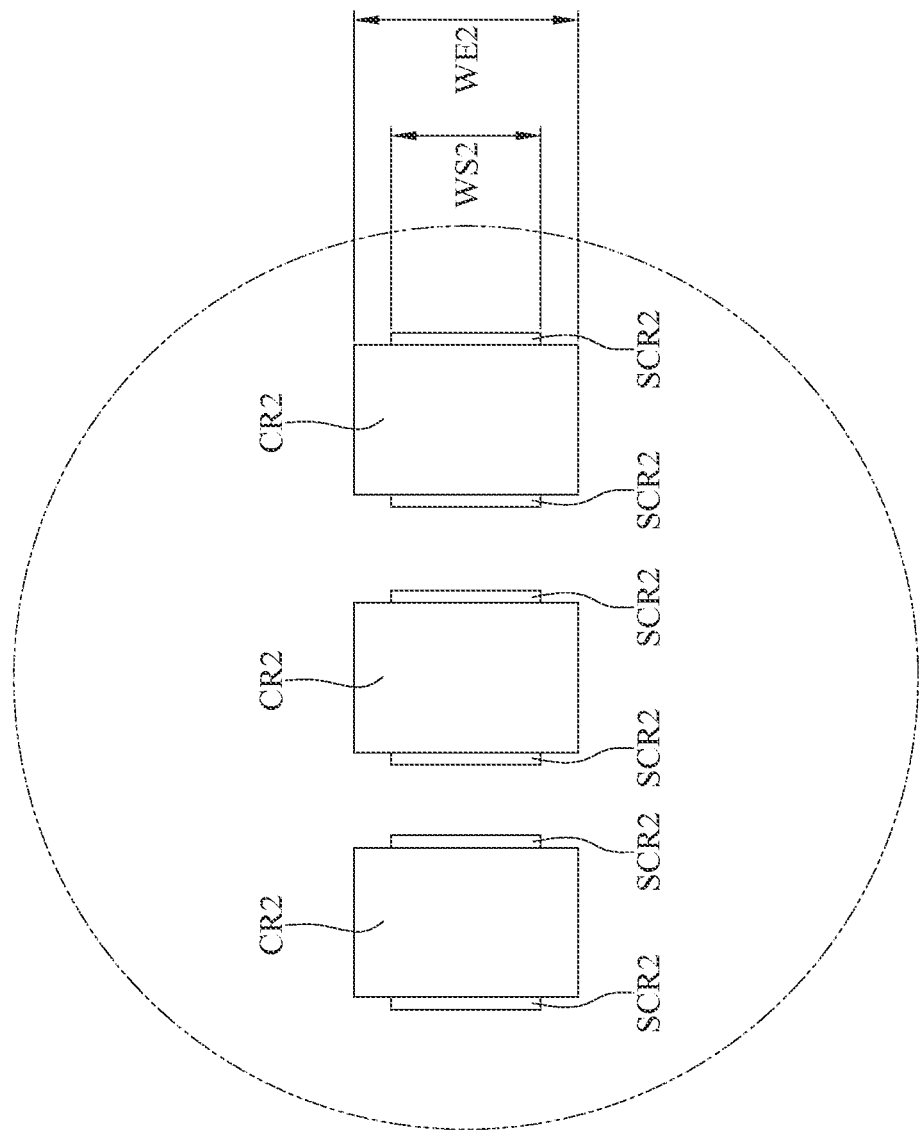
FIG. 11 is an enlarged view of conductive routes and lateral conducting wires of the electrical transmission part of the circuit element in region EL3 in FIG. 8 according to another example of the present disclosure.
Figure 12:
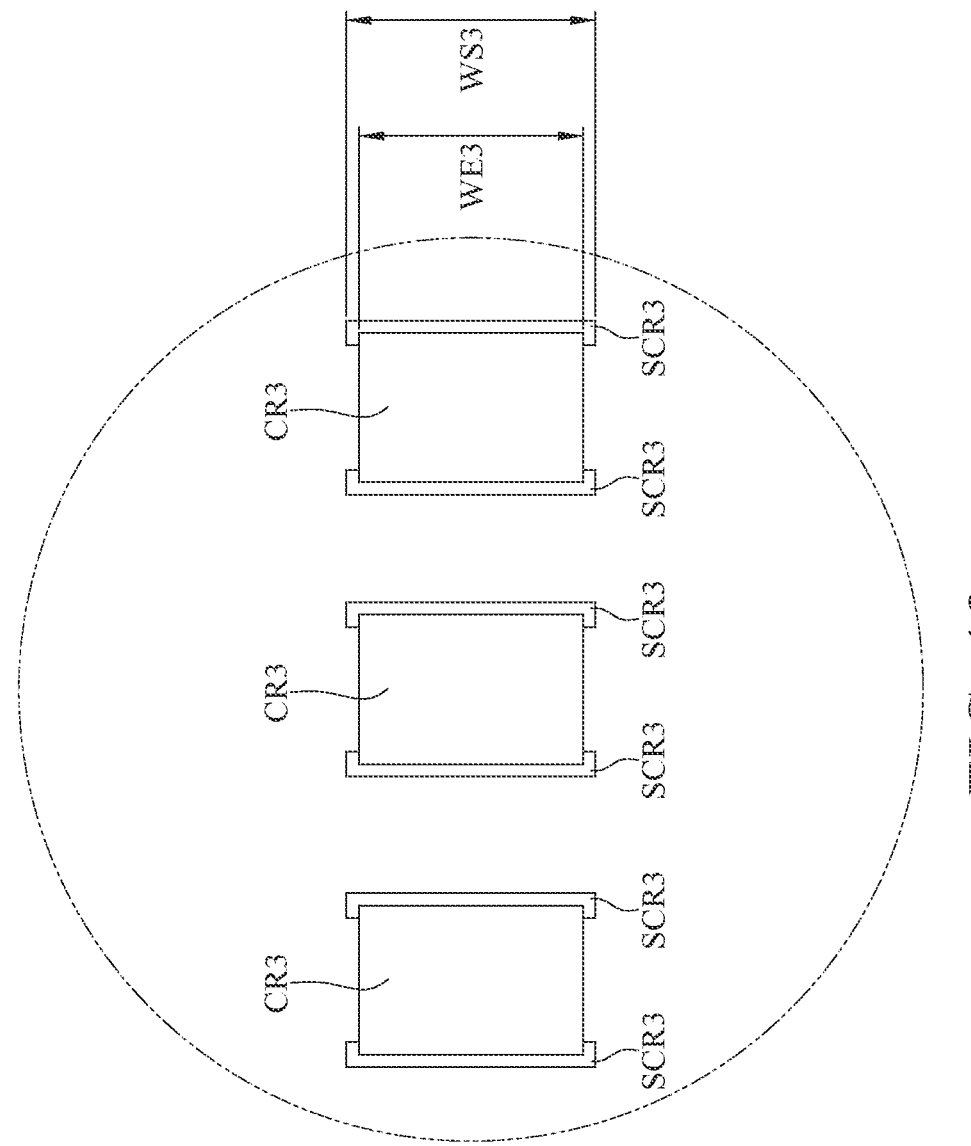
FIG. 12 is an enlarged view of conductive routes and lateral conducting wires of the electrical transmission part of the circuit element in region EL3 in FIG. 8 according to another example of the present disclosure.
Figure 13:
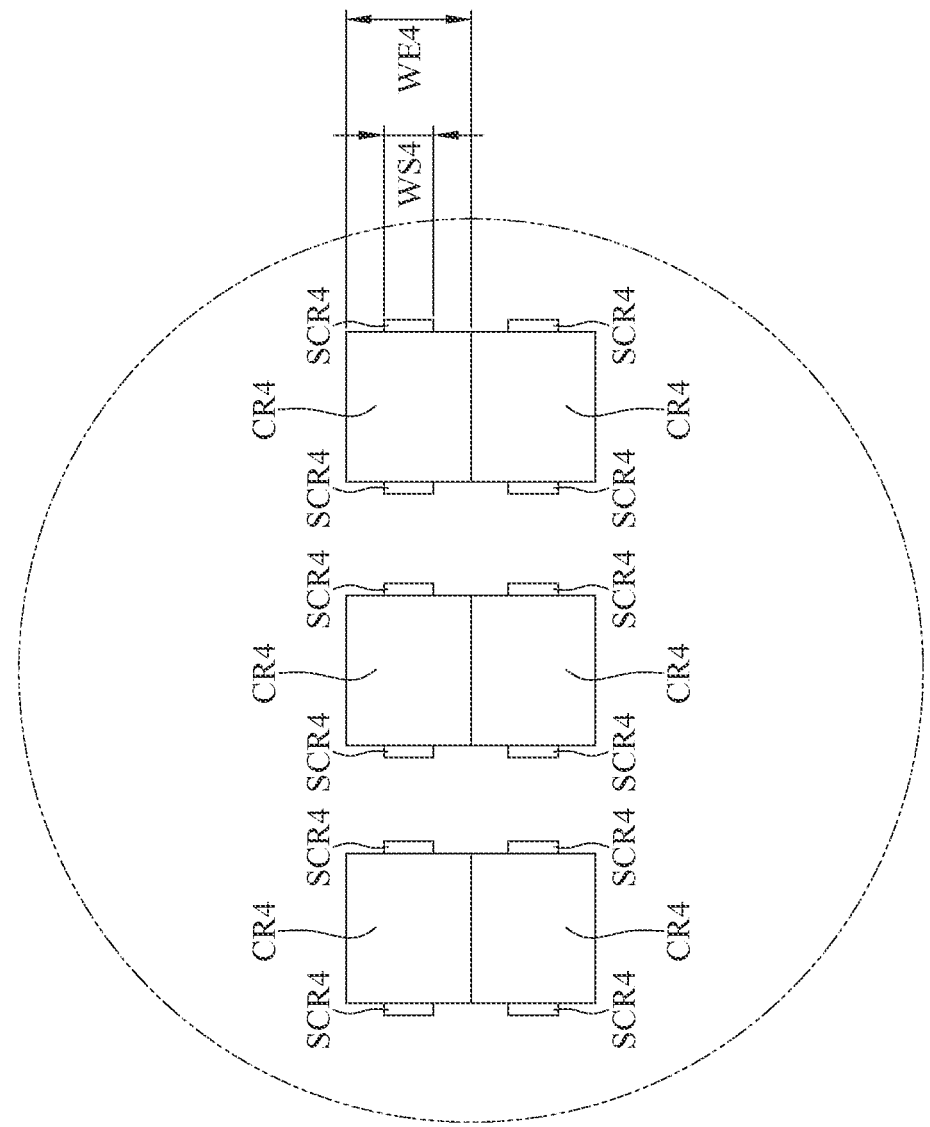
FIG. 13 is an enlarged view of conductive routes and lateral conducting wires of the electrical transmission part of the circuit element in region EL3 in FIG. 8 according to another example of the present disclosure.
Figure 14:
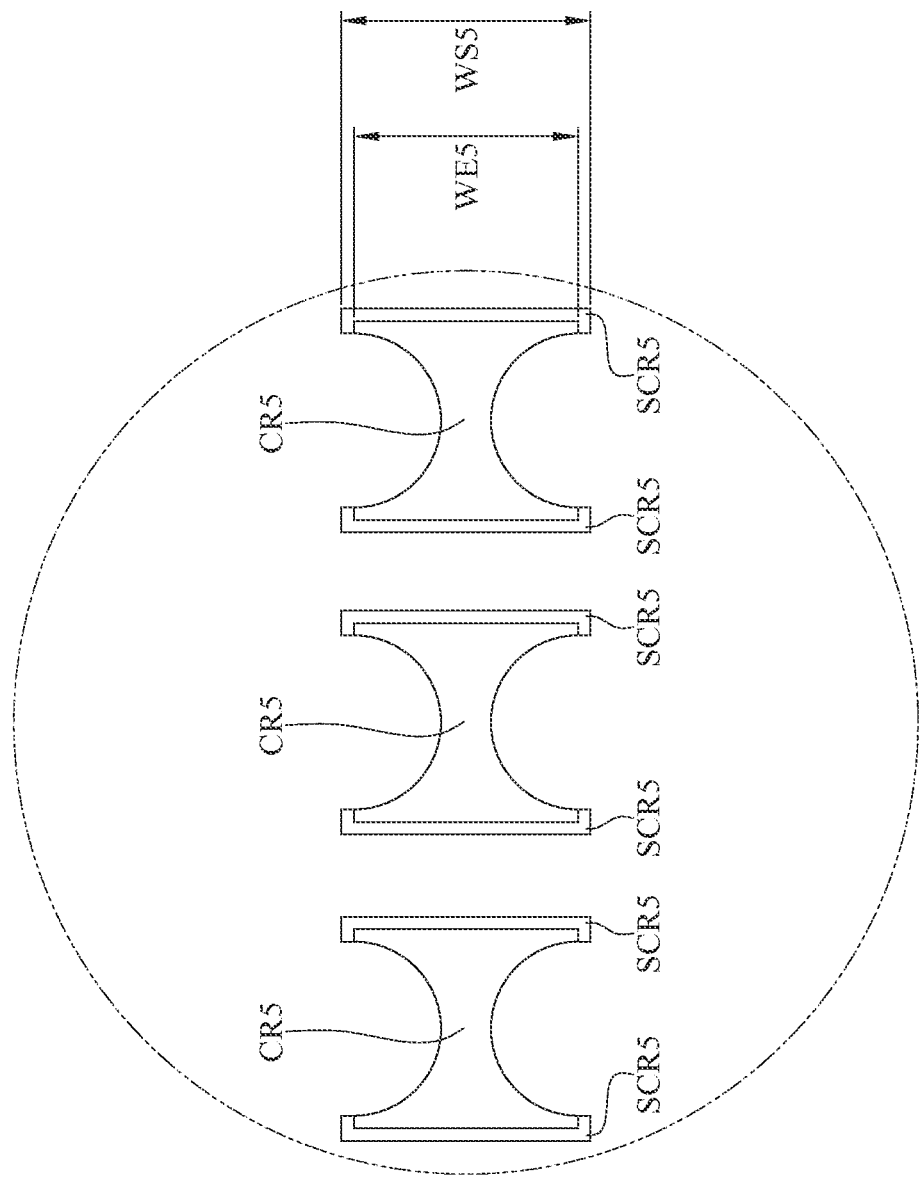
FIG. 14 is an enlarged view of conductive routes and lateral conducting wires of the electrical transmission part of the circuit element in region EL3 in FIG. 8 according to another example of the present disclosure.

Please refer to FIG. 8 to FIG. 10, where FIG. 10 is an enlarged view of conductive routes and lateral conducting wires of an electrical transmission part of the circuit element in region EL3 in FIG. 8 according to one example of the present disclosure. In this embodiment, the electrical transmission part 233 further has a plurality of lateral conducting wires SCR1, and the lateral conducting wires SCR1 are respectively disposed on lateral sides of the conductive routes CR1. As shown in FIG. 10, a width WS1 of the lateral conducting wires SCR1 is equal to a width WE1 of the lateral sides of the conductive routes CR1, but the present disclosure is not limited to the above described configuration. For example, please refer to FIG. 11 to FIG. 14, which are enlarged views of conductive routes and lateral conducting wires of the electrical transmission part of the circuit element in region EL3 in FIG. 8 according to other examples of the present disclosure. As shown in FIG. 11, in one configuration, a width WS2 of a lateral conducting wire SCR2 is smaller than a width WE2 of a lateral side of a conductive route CR2. As shown in FIG. 12, in one configuration, a width WS3 of a lateral conducting wire SCR3 is larger than a width WE3 of a lateral side of a conductive route CR3, and the lateral conducting wire SCR3 further extends and covers a part of a top side and a part of a bottom side of the conductive route CR3. As shown in FIG. 13, in one configuration, every two of conductive routes CR4 are stacked on each other, lateral conducting wires SCR4 are disposed on lateral sides of the conductive routes CR4 and a width WS4 of the lateral conducting wires SCR4 is smaller than a width WE4 of the lateral sides of the conductive routes CR4. As shown in FIG. 14, in one configuration, a cross-section of a conductive route CR5 is non-rectangular, and the conductive route CR5 has two curved recesses respectively located at a top side and a bottom side thereof. A width WS5 of a lateral conducting wire SCR5 is larger than a width WE5 of a lateral side of the conductive route CR5, and the lateral conducting wire SCR5 further extends and covers a part of the top side and a part of the bottom side of the conductive route CR5.

2nd Embodiment

Figure 15:
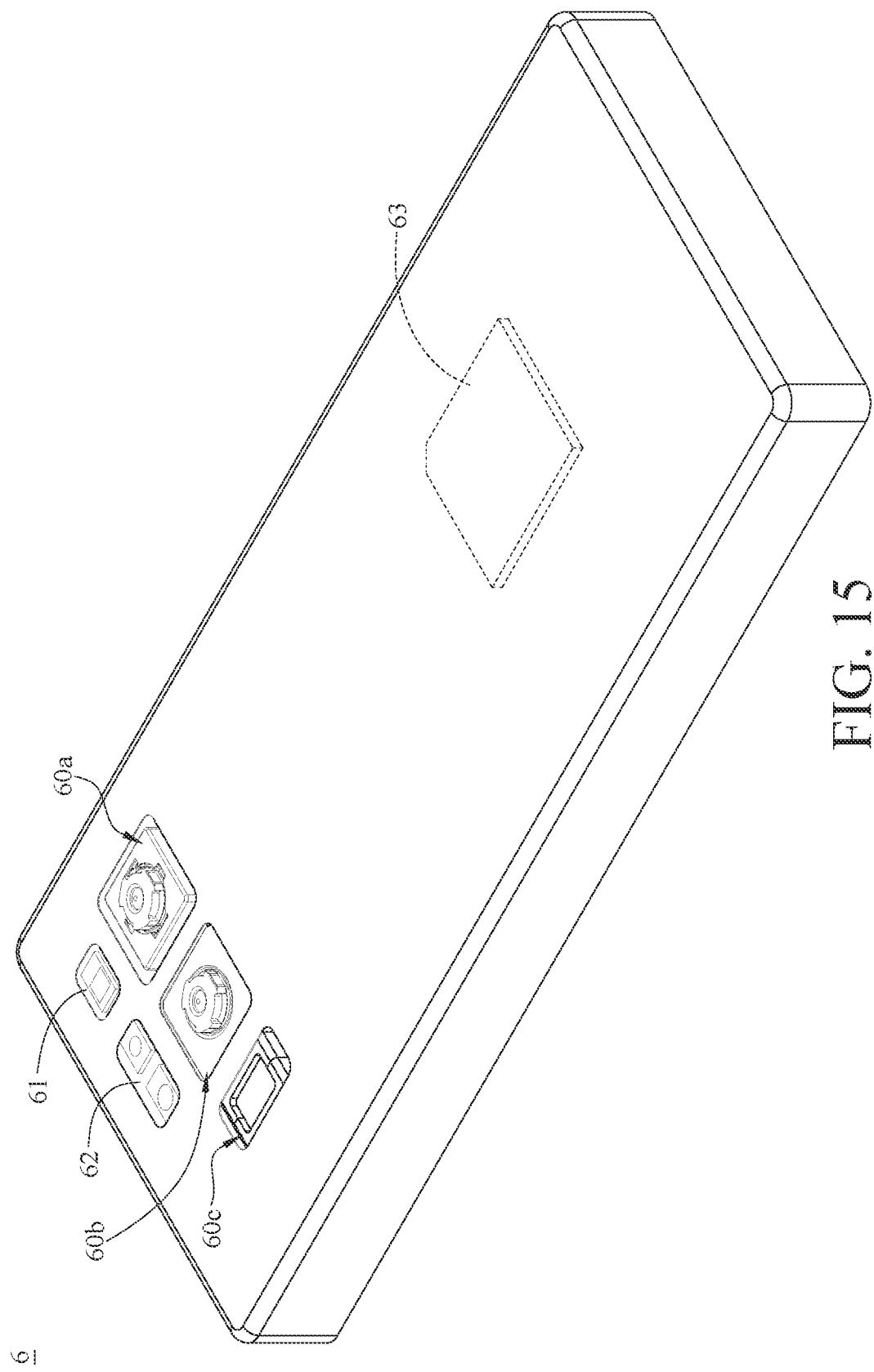
FIG. 15 is one perspective view of an electronic device according to the 2nd embodiment of the present disclosure.
Figure 16:
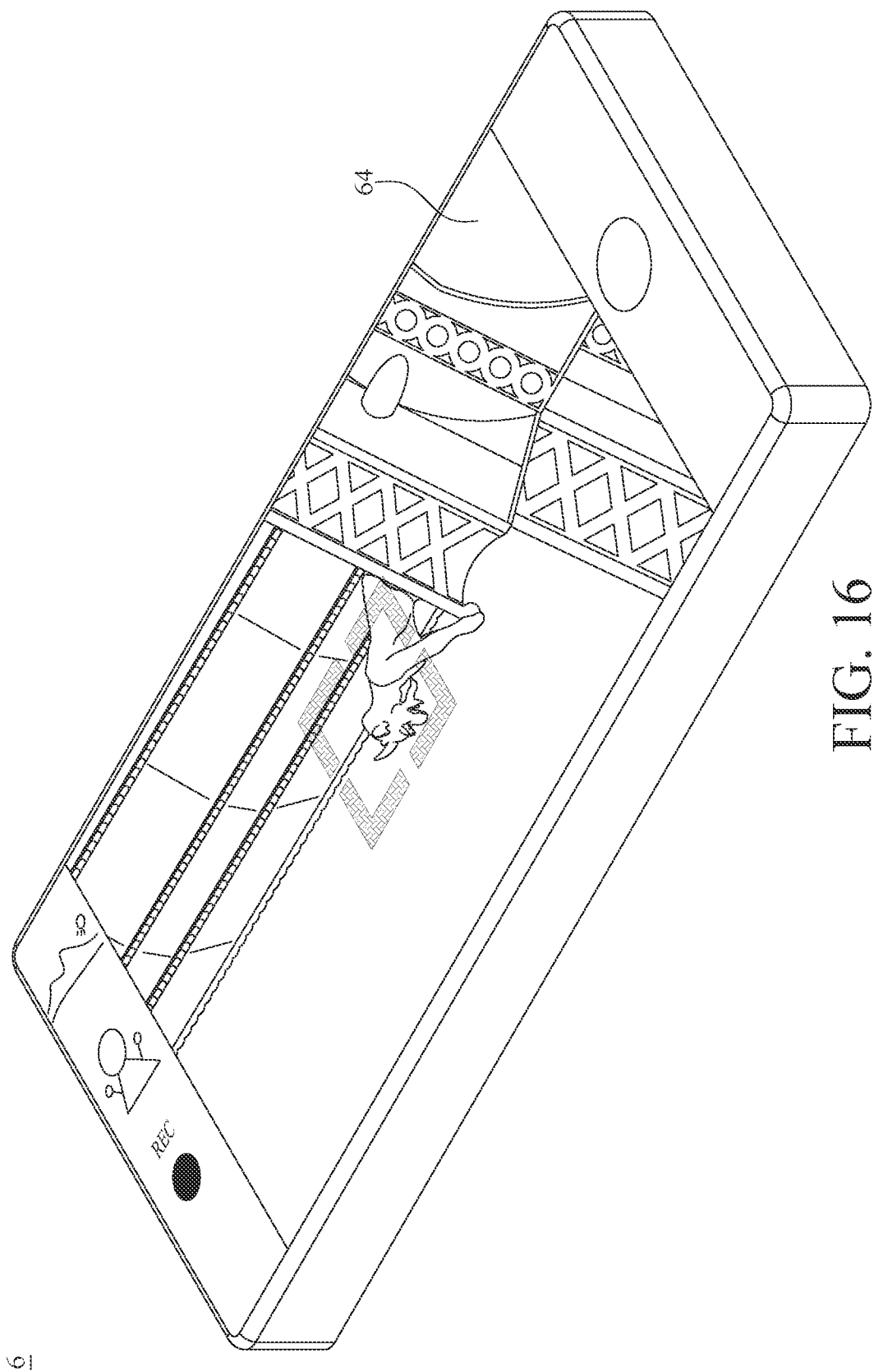
FIG. 16 is another perspective view of the electronic device in FIG. 15.

Please refer to FIG. 15 and FIG. 16. FIG. 15 is one perspective view of an electronic device according to the 2nd embodiment of the present disclosure, and FIG. 16 is another perspective view of the electronic device in FIG. 15.

In this embodiment, the electronic device 6 is a smartphone including a plurality of camera modules, a flash module 61, a focus assist module 62, an image signal processor 63, a display module (user interface) 64 and an image software processor (not shown).

The camera modules include an ultra-wide-angle camera module 60a, a high pixel camera module 60b and a telephoto camera module 60c. Moreover, at least one of the camera modules 60a, 60b and 60c includes the optical image stabilization driver device of the present disclosure.

Figure 17:
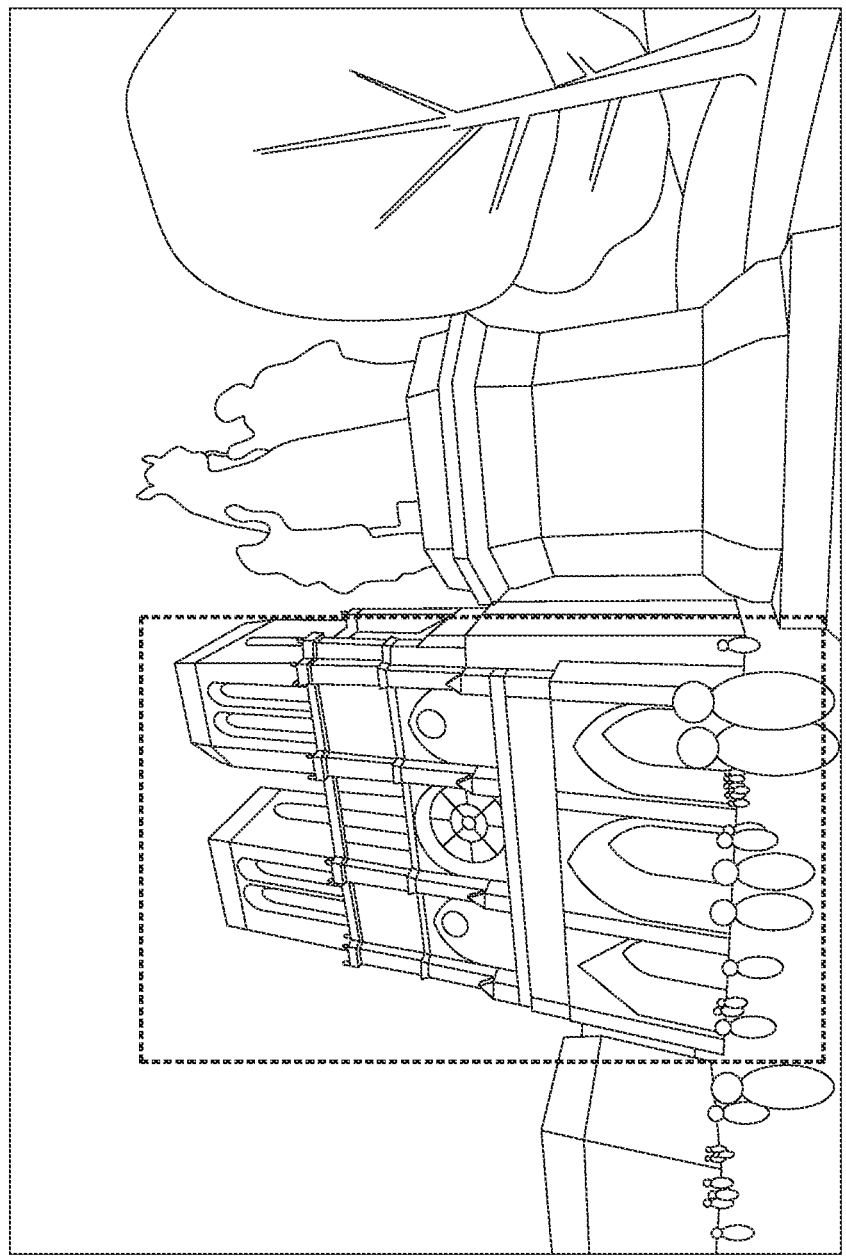
FIG. 17 is an image captured by an ultra-wide-angle camera module.

The image captured by the ultra-wide-angle camera module 60a enjoys a feature of multiple imaged objects. FIG. 17 is an image captured by the ultra-wide-angle camera module 60a.

Figure 18:
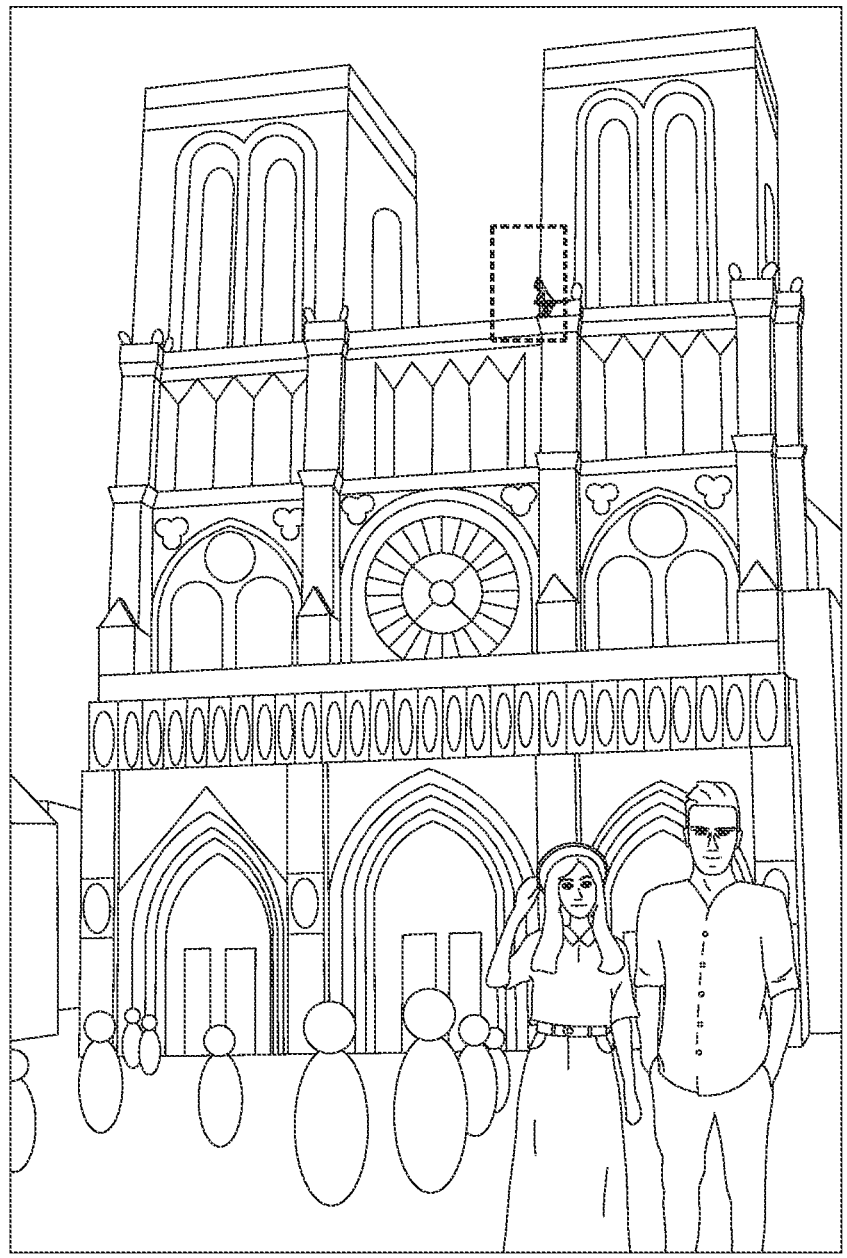
FIG. 18 is an image captured by a high pixel camera module.

The image captured by the high pixel camera module 60b enjoys a feature of high resolution and less distortion, and the high pixel camera module 60b can capture part of the image in FIG. 17. FIG. 18 is an image captured by the high pixel camera module 60b.

Figure 19:
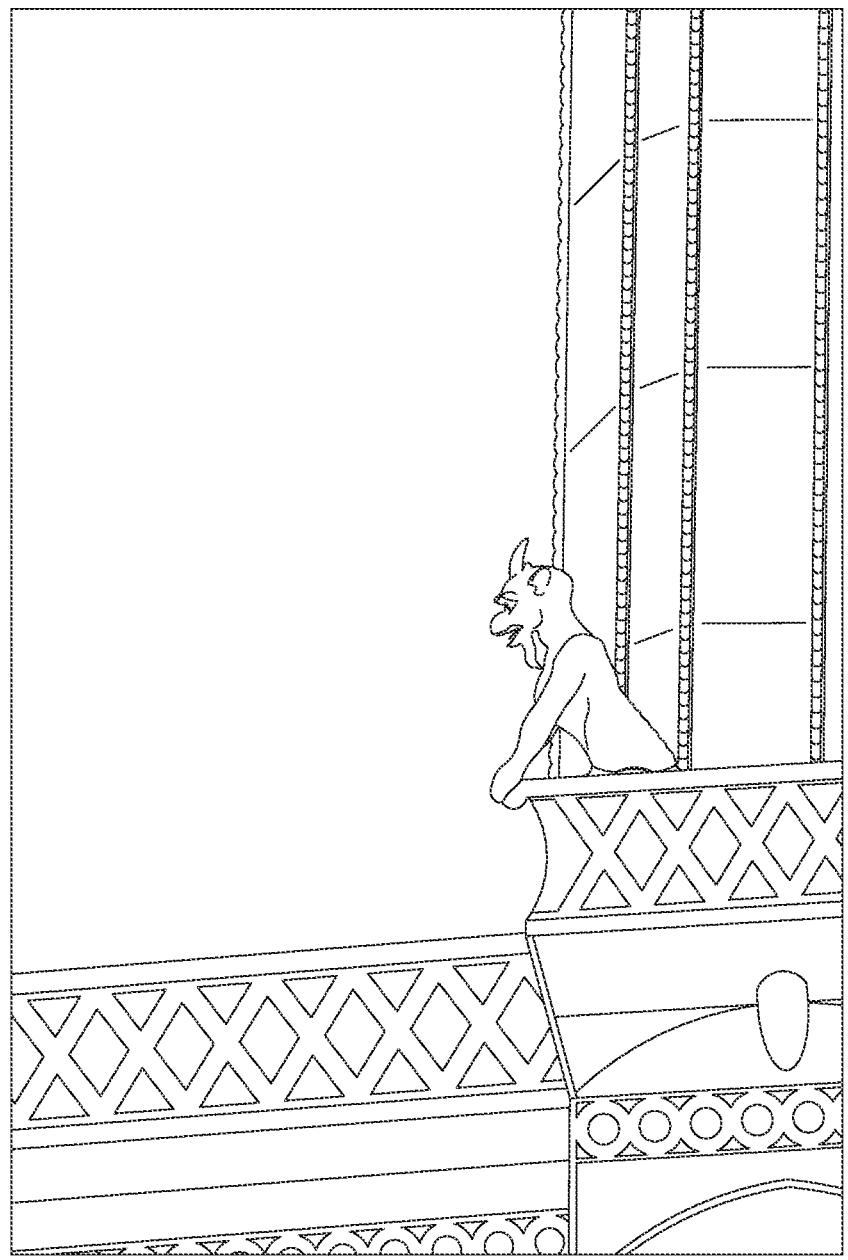
FIG. 19 is an image captured by a telephoto camera module.

The image captured by the telephoto camera module 60c enjoys a feature of high optical magnification, and the telephoto camera module 60c can capture part of the image in FIG. 18. FIG. 19 is an image captured by the telephoto camera module 60c. The maximum field of view (FOV) of the camera module corresponds to the field of view in FIG. 19.

When a user captures images of an object, the light rays converge in the ultra-wide-angle camera module 60a, the high pixel camera module 60b or the telephoto camera module 60c to generate images, and the flash module 61 is activated for light supplement. The focus assist module 62 detects the object distance of the imaged object to achieve fast auto focusing. The image signal processor 63 is configured to optimize the captured image to improve image quality and provided zooming function. The light beam emitted from the focus assist module 62 can be either conventional infrared or laser. The display module 64 can include a touch screen, and the user is able to interact with the display module 64 to adjust the angle of view and switch between different camera modules, and the image software processor having multiple functions to capture images and complete image processing. Alternatively, the user may capture images via a physical button. The image processed by the image software processor can be displayed on the display module 64.

3rd Embodiment

Figure 20:
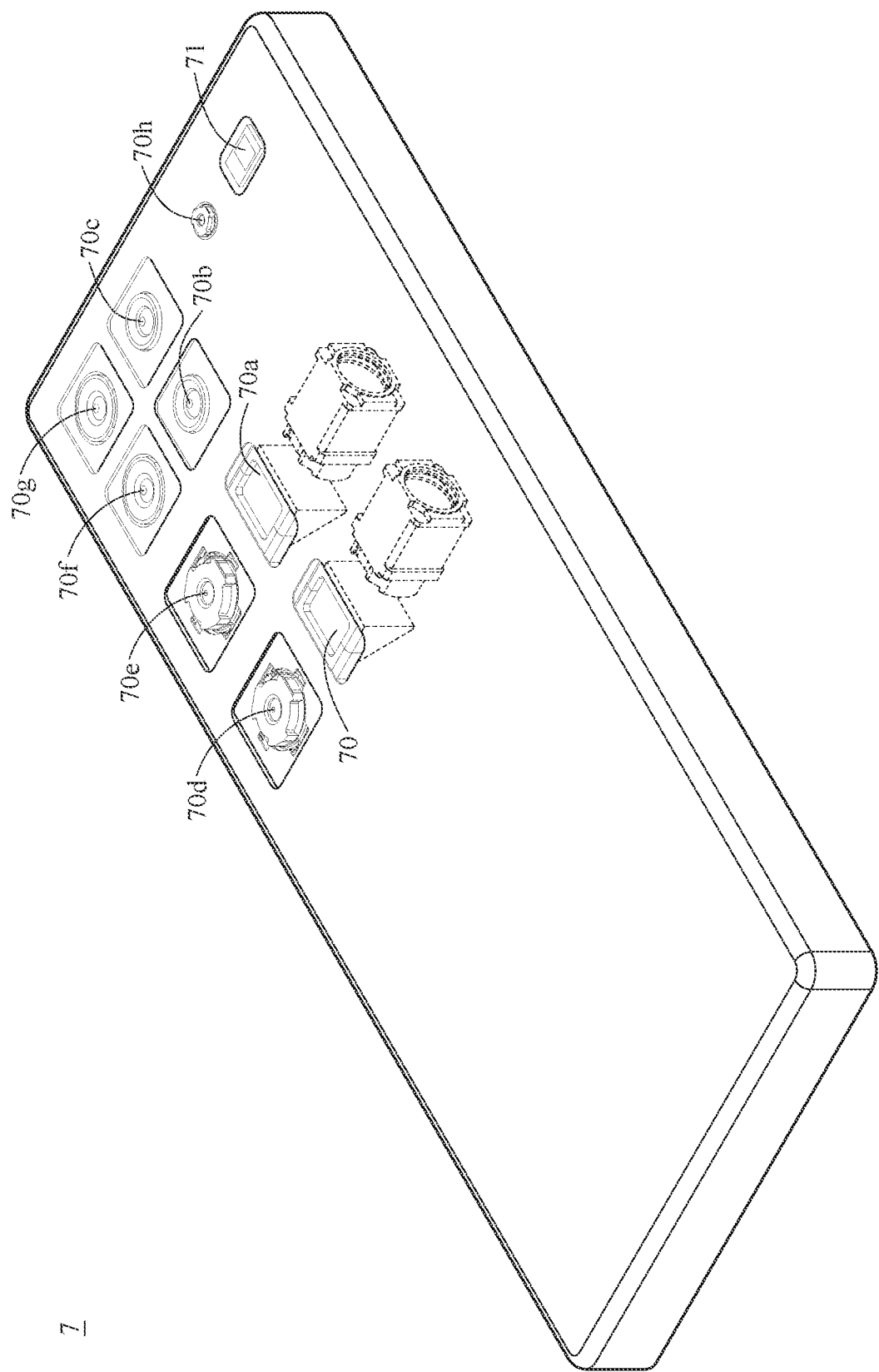
FIG. 20 is one perspective view of an electronic device according to the 3rd embodiment of the present disclosure.

Please refer to FIG. 20, which is one perspective view of an electronic device according to the 3rd embodiment of the present disclosure.

In this embodiment, the electronic device 7 is a smartphone including a camera module 70, a camera module 70a, a camera module 70b, a camera module 70c, a camera module 70d, a camera module 70e, a camera module 70f, a camera module 70g, a camera module 70h, a flash module 71, an image signal processor, a display module and an image software processor (not shown). The camera module 70, the camera module 70a, the camera module 70b, the camera module 70c, the camera module 70d, the camera module 70e, the camera module 70f, the camera module 70g and the camera module 70h are disposed on the same side of the electronic device 7, while the display module is disposed on the opposite side of the electronic device 7. At least one of the camera modules 70, 70a, 70b, 70c, 70d, 70e, 70f, 70g and 70h includes the optical image stabilization driver device of the present disclosure.

The camera module 70 is a telephoto camera module, the camera module 70a is a telephoto camera module, the camera module 70b is a telephoto camera module, the camera module 70c is a telephoto camera module, the camera module 70d is a wide-angle camera module, the camera module 70e is a wide-angle camera module, the camera module 70f is an ultra-wide-angle camera module, the camera module 70g is an ultra-wide-angle camera module, and the camera module 70h is a ToF (time of flight) camera module. In this embodiment, the camera module 70, the camera module 70a, the camera module 70b, the camera module 70c, the camera module 70d, the camera module 70e, the camera module 70f and the camera module 70g have different fields of view, such that the electronic device 7 can have various magnification ratios so as to meet the requirement of optical zoom functionality. In addition, the camera module 70 and the camera module 70a are telephoto camera modules having a light-folding element configuration. In addition, the camera module 70h can determine depth information of the imaged object. In this embodiment, the electronic device 7 includes multiple camera modules 70, 70a, 70b, 70c, 70d, 70e, 70f, 70g, and 70h, but the present disclosure is not limited to the number and arrangement of camera module. When a user captures images of an object, the light rays converge in the camera module 70, 70a, 70b, 70c, 70d, 70e, 70f, 70g or 70h to generate an image(s), and the flash module 71 is activated for light supplement. Further, the subsequent processes are performed in a manner similar to the abovementioned embodiments, so the details in this regard will not be provided again.

4th Embodiment

Figure 21:
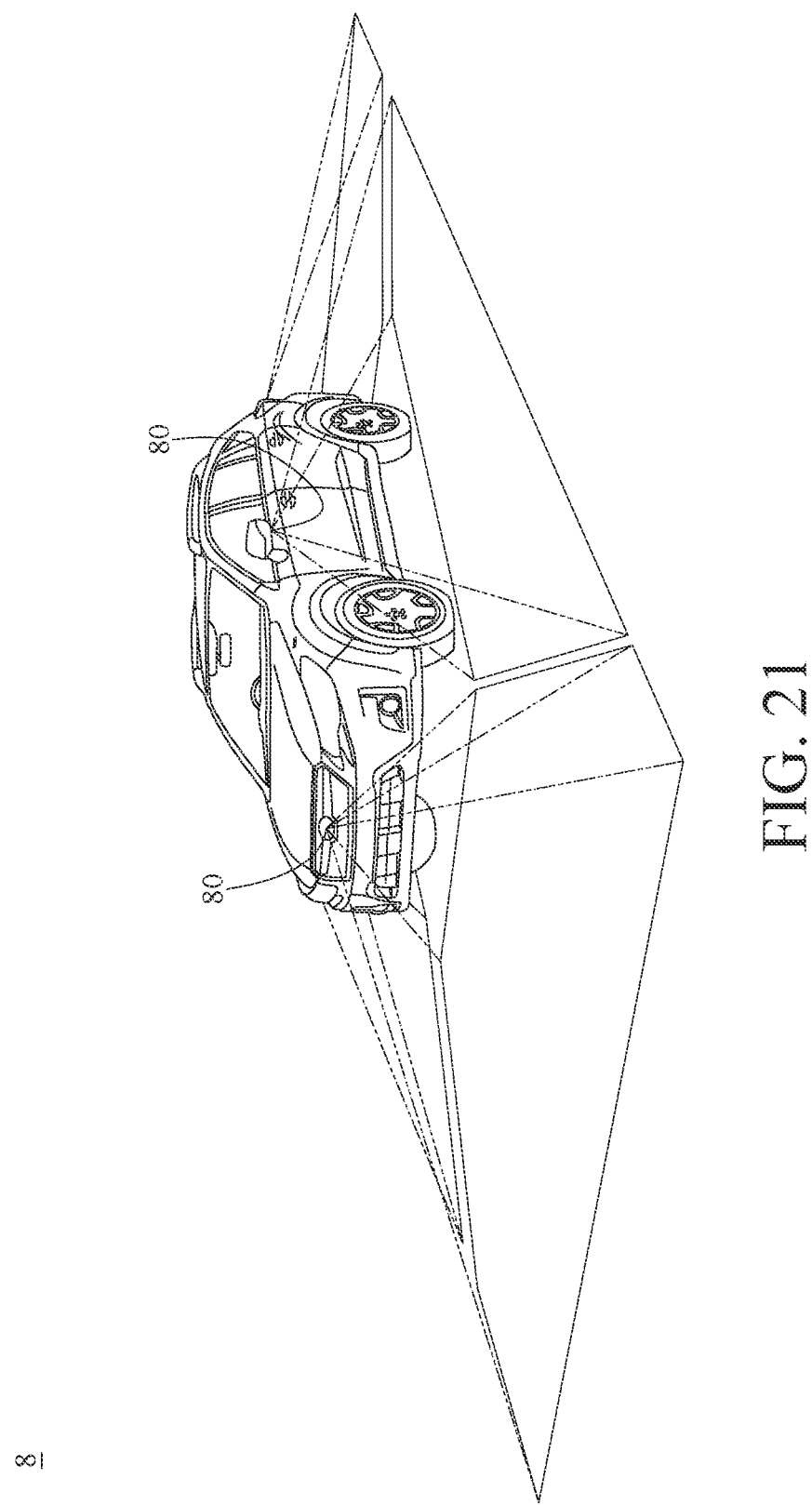
FIG. 21 is a perspective view of an electronic device according to the 4th embodiment of the present disclosure.
Figure 22:
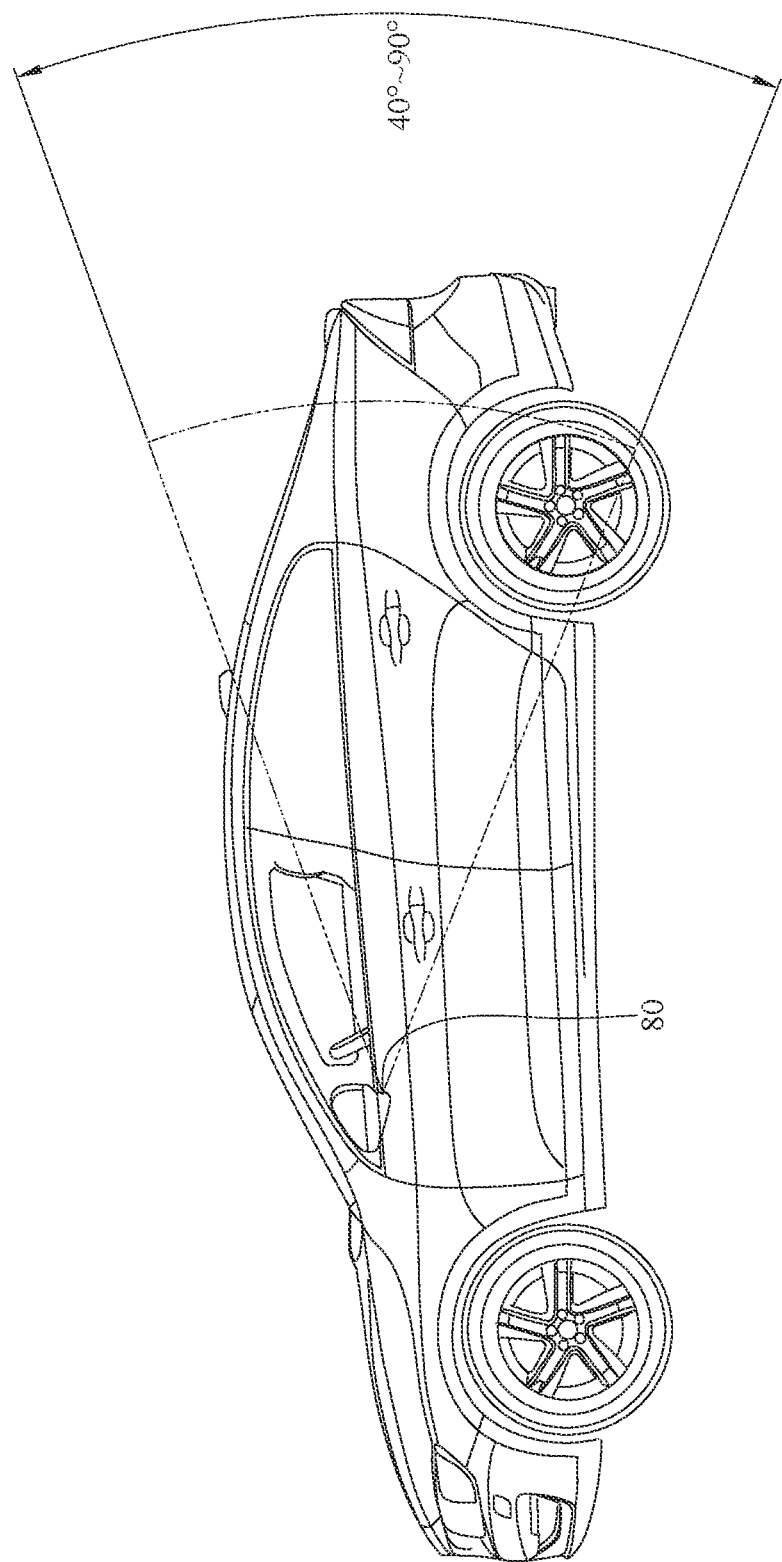
FIG. 22 is a side view of the electronic device in FIG. 21.
Figure 23:
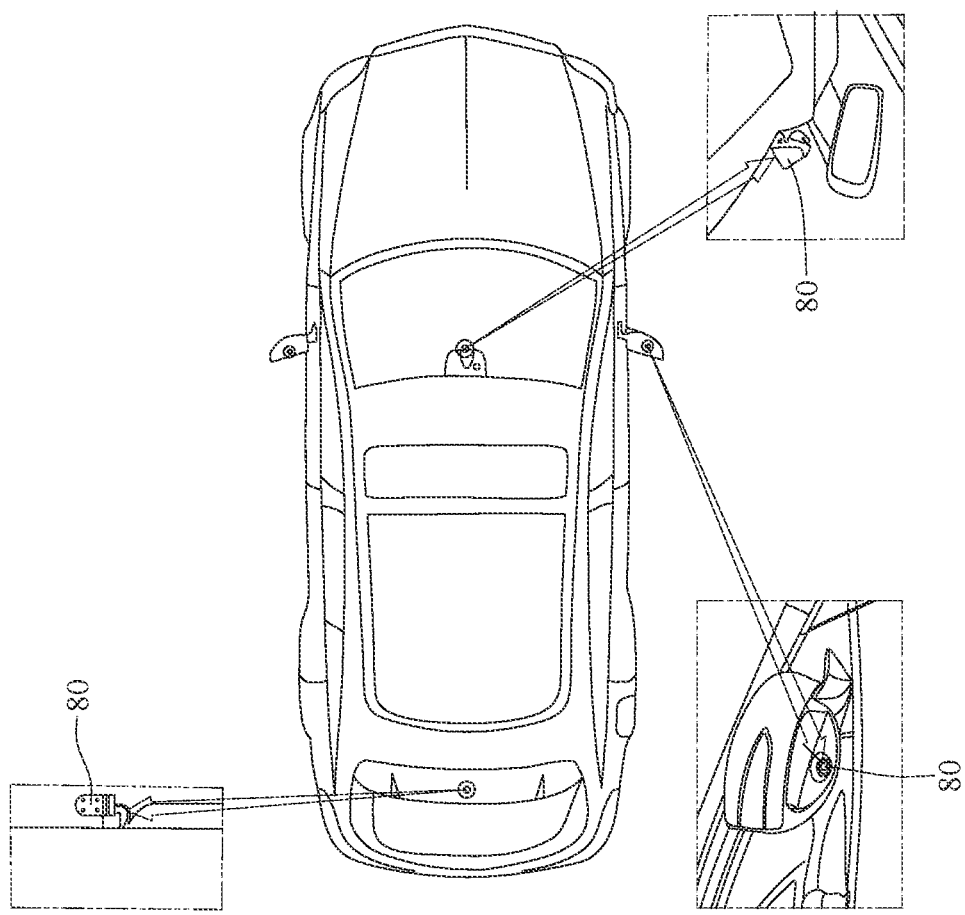
FIG. 23 is a top view of the electronic device in FIG. 21.

Please refer to FIG. 21 to FIG. 23. FIG. 21 is a perspective view of an electronic device according to the 4th embodiment of the present disclosure, FIG. 22 is a side view of the electronic device in FIG. 21, and FIG. 23 is a top view of the electronic device in FIG. 21.

In this embodiment, the electronic device 8 is an automobile. The electronic device 8 includes a plurality of automotive camera modules 80, and the camera modules 80, for example, each includes the camera module of the present disclosure. The camera modules 80 can be served as, for example, panoramic view car cameras, dashboard cameras and vehicle backup cameras.

As shown in FIG. 21, the camera modules 80 are, for example, disposed around the automobile to capture peripheral images of the automobile, which is favorable for obtaining external traffic information so as to achieve autopilot function. In addition, the image software processor may blend the peripheral images into one panoramic view image for the driver's checking every corner surrounding the automobile, thereby favorable for parking and driving.

As shown in FIG. 22, the camera modules 80 are, for example, respectively disposed on the lower portion of the side mirrors. A maximum field of view of the camera modules 80 can be 40 degrees to 90 degrees for capturing images in regions on left and right lanes.

As shown in FIG. 23, the camera modules 80 can also be, for example, respectively disposed on the lower portion of the side mirrors and inside the front and rear windshields for providing external information to the driver, and also providing more viewing angles so as to reduce blind spots, thereby improving driving safety.

The smartphones, panoramic view car cameras, dashboard cameras and vehicle backup cameras in the embodiments are only exemplary for showing the optical image stabilization driver device and the camera module of the present disclosure installed in an electronic device, and the present disclosure is not limited thereto. The optical image stabilization driver device and the camera module can be optionally applied to optical systems with a movable focus. Furthermore, the optical image stabilization driver device and the camera module feature good capability in aberration corrections and high image quality, and can be applied to 3D (three-dimensional) image capturing applications, in products such as digital cameras, mobile devices, digital tablets, smart televisions, network surveillance devices, multi-camera devices, image recognition systems, motion sensing input devices, wearable devices and other electronic imaging devices.

The foregoing description, for the purpose of explanation, has been described with reference to specific embodiments. It is to be noted that the present disclosure shows different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An optical image stabilization driver device comprising:
   an image sensor;
   at least one fixed carrier;
   a circuit element comprising:
      a fixed part disposed on the at least one fixed carrier;
      a movable part, wherein the image sensor is disposed on the movable part and electrically connected to the movable part; and
      an electrical transmission part having a plurality of conductive routes, wherein the plurality of conductive routes are electrically connected to the movable part and the fixed part, and the plurality of conductive routes are configured to transmit an electrical signal of the image sensor from the movable part to the fixed part;
   an elastic element comprising:
      a first frame part corresponding to the fixed part of the circuit element;
      a second frame part corresponding to the movable part of the circuit element; and
      an elastic connection part connected to the first frame part and the second frame part, wherein the elastic connection part provides the image sensor with a freedom of movement in a plane; and
   a driving element configured to drive the image sensor to move relative to the at least one fixed carrier in the plane;
   wherein the optical image stabilization driver device further comprises an insulation element, and at least a part of the insulation element is disposed corresponding to at least one of the electrical transmission part, the fixed part and the movable part of the circuit element;
   wherein the insulation element is located between the circuit element and the elastic element, and at least a part of the insulation element is disposed corresponding to at least a part of the electrical transmission part of the circuit element.

2. The optical image stabilization driver device of claim 1, wherein the circuit element is a flat structure, and the elastic element is a flat structure;
   wherein a thickness of the circuit element is Hc, a thickness of the elastic element is He, and the following conditions are satisfied:

$$0.01 \text{ mm} < Hc < 0.85 \text{ mm; and}$$

$$0.01 \text{ mm} < He < 0.85 \text{ mm.}$$

3. The optical image stabilization driver device of claim 1, wherein a thickness of the circuit element is Hc, a thickness of the elastic element is He, and the following condition is satisfied:

$$Hc < He.$$

4. The optical image stabilization driver device of claim 1, wherein the elastic connection part has a plurality of elastic arms, and two ends of each of the plurality of elastic arms are respectively connected to the first frame part and the second frame part;
   wherein the plurality of elastic arms are not in physical contact with the plurality of conductive routes.

5. The optical image stabilization driver device of claim 4, wherein each of the plurality of elastic arms comprises at least one curved part located between the two ends of each of the plurality of elastic arms.

6. The optical image stabilization driver device of claim 4, wherein a height of each of the plurality of elastic arms is H, a width of each of the plurality of elastic arms is W, and the following condition is satisfied:

$$0.2 \leq W/H \leq 1.$$

7. The optical image stabilization driver device of claim 1, wherein the elastic connection part provides the movable part with an axial support force and a translational restoring force.

8. The optical image stabilization driver device of claim 1, wherein the driving element comprises a coil and a magnet, the coil and the magnet are disposed corresponding to each other, and the coil and the magnet are configured to provide a driving force for optical image stabilization.

9. The optical image stabilization driver device of claim 1, wherein the electrical transmission part has at least one lateral conducting wire, and the at least one lateral conducting wire is disposed on a lateral side of at least one of the plurality of conductive routes.

10. A camera module comprising:
    an optical imaging device;
    an autofocus driving device configured to drive the optical imaging device to move along an optical axis of the optical imaging device; and the optical image stabilization driver device of claim 1, wherein the image sensor of the optical image stabilization driver device is disposed on an image surface of the optical imaging device.

11. An electronic device comprising:
the camera module of claim 10.

12. An optical image stabilization driver device comprising:
an image sensor;
at least one fixed carrier;
a circuit element comprising:
   a fixed part disposed on the at least one fixed carrier;
   a movable part, wherein the image sensor is disposed on the movable part and electrically connected to the movable part; and
   an electrical transmission part having a plurality of conductive routes, wherein the plurality of conductive routes are electrically connected to the movable part and the fixed part, and the plurality of conductive routes are configured to transmit an electrical signal of the image sensor from the movable part to the fixed part;
an elastic element comprising:
   a first frame part corresponding to the fixed part of the circuit element;
   a second frame part corresponding to the movable part of the circuit element; and
   an elastic connection part connected to the first frame part and the second frame part, wherein the elastic connection part provides the image sensor with a freedom of movement in a plane; and
a driving element configured to drive the image sensor to move relative to the at least one fixed carrier in the plane;
wherein the elastic connection part has a plurality of elastic arms, two ends of each of the plurality of elastic arms are respectively connected to the first frame part and the second frame part, and the plurality of elastic arms are not in physical contact with the plurality of conductive routes;
wherein the electrical transmission part and the elastic connection part do not overlap in a stacking direction of the circuit element and the elastic element.

13. The optical image stabilization driver device of claim 12, wherein each of the elastic arms comprises at least one curved part located between the two ends of each of the plurality of elastic arms.

14. The optical image stabilization driver device of claim 12, wherein a height of each of the elastic arms is H, a width of each of the elastic arms is W, and the following condition is satisfied:

$$0.2 \leq W/H \leq 1.$$

15. The optical image stabilization driver device of claim 12, wherein the elastic connection part provides the movable part with an axial support force and a translational restoring force.

16. The optical image stabilization driver device of claim 12, wherein the circuit element is a flat structure and the elastic element is a flat structure;
wherein a thickness of the circuit element is Hc, a thickness of the elastic element is He, and the following conditions are satisfied:

$$0.01 \text{ mm} < Hc < 0.85 \text{ mm; and}$$

$$0.01 \text{ mm} < He < 0.85 \text{ mm.}$$

17. The optical image stabilization driver device of claim 12, wherein a thickness of the circuit element is Hc, a thickness of the elastic element is He, and the following condition is satisfied:

$$Hc < He.$$

18. The optical image stabilization driver device of claim 12, wherein a Young's modulus of the elastic element is larger than a Young's modulus of the circuit element.

19. The optical image stabilization driver device of claim 12, wherein the electrical transmission part has at least one lateral conducting wire, and the at least one lateral conducting wire is disposed on a lateral side of at least one of the plurality of conductive routes.

20. The optical image stabilization driver device of claim 12, wherein the circuit element has a polyimide material.

21. The optical image stabilization driver device of claim 12, further comprising a damper disposed on at least a part of the electrical transmission part.

* * * * *